United States Patent
Ayzenshtat et al.

(10) Patent No.: US 11,657,417 B2
(45) Date of Patent: May 23, 2023

(54) METHODS AND APPARATUS TO IDENTIFY AFFINITY BETWEEN SEGMENT ATTRIBUTES AND PRODUCT CHARACTERISTICS

(71) Applicant: Nielsen Consumer LLC, New York, NY (US)

(72) Inventors: Leonid Ayzenshtat, Jacksonville, FL (US); Kalyanraman Rajamani, Tampa, FL (US); Alexey Vishnevskiy, New York, NY (US); Nikolay Georgiev, San Jose, CA (US); Mara Preotescu, New York, NY (US)

(73) Assignee: NIELSEN CONSUMER LLC, Chicago, IL (US)

( * ) Notice: Subject to any disclaimer, the term of this patent is extended or adjusted under 35 U.S.C. 154(b) by 44 days.

(21) Appl. No.: 17/160,001

(22) Filed: Jan. 27, 2021

(65) Prior Publication Data

US 2021/0150552 A1    May 20, 2021

Related U.S. Application Data

(63) Continuation of application No. 16/180,812, filed on Nov. 5, 2018, now Pat. No. 10,909,560, which is a
(Continued)

(51) Int. Cl.
*G06Q 30/0204* (2023.01)

(52) U.S. Cl.
CPC .................. *G06Q 30/0204* (2013.01)

(58) Field of Classification Search
None
See application file for complete search history.

(56) References Cited

U.S. PATENT DOCUMENTS

| | | |
|---|---|---|
| 4,115,761 A | 9/1978 | Ueda et al. |
| 4,603,232 A | 7/1986 | Kurland et al. |
| | (Continued) | |

FOREIGN PATENT DOCUMENTS

| | | |
|---|---|---|
| JP | 2001331627 | 11/2001 |
| JP | 2002015097 | 1/2002 |
| | (Continued) | |

OTHER PUBLICATIONS

Kyle "The Effect of Brand Affinity on Investor Stock Choice", Dec. 2015, Alliance Manchester Business School, pp. 1-190 (Year: 2015).*

(Continued)

*Primary Examiner* — Romain Jeanty
(74) *Attorney, Agent, or Firm* — Hanley, Flight & Zimmerman, LLC

(57) ABSTRACT

Methods, apparatus, systems and articles of manufacture are disclosed to identify affinity between segment attributes and product characteristics. An example method includes identifying, with a processor, a set of product characteristics from purchase transactions that exhibit a threshold product affinity, selecting, with the processor, a set of products having at least one product characteristic from the set of product characteristics that exhibit the threshold product affinity, the set of products associated with first segments, extracting, with the processor, segment attributes from the first segments, and improving a market success of the product of interest by identifying, with the processor, target segments based on ones of the extracted segment attributes exhibiting a threshold segment affinity.

20 Claims, 16 Drawing Sheets

Related U.S. Application Data continuation of application No. 14/821,363, filed on Aug. 7, 2015, now Pat. No. 10,147,108.

(60) Provisional application No. 62/142,427, filed on Apr. 2, 2015.

(56) References Cited

U.S. PATENT DOCUMENTS

| | | | |
|---|---|---|---|
| 4,908,761 | A | 3/1990 | Tai |
| 4,935,877 | A | 6/1990 | Koza |
| 5,041,972 | A | 8/1991 | Frost |
| 5,090,909 | A | 2/1992 | Keller et al. |
| 5,124,911 | A | 6/1992 | Sack |
| 5,124,991 | A | 6/1992 | Allen |
| 5,222,192 | A | 6/1993 | Shaefer |
| 5,255,345 | A | 10/1993 | Shaefer |
| 5,299,115 | A | 3/1994 | Fields et al. |
| 5,321,833 | A | 6/1994 | Chang et al. |
| 5,375,195 | A | 12/1994 | Johnston |
| 5,400,248 | A | 3/1995 | Chisholm |
| 5,420,786 | A | 5/1995 | Felthauser et al. |
| 5,559,729 | A | 9/1996 | Abe |
| 5,583,763 | A | 12/1996 | Atcheson et al. |
| 5,608,424 | A | 3/1997 | Takahashi et al. |
| 5,615,341 | A | 3/1997 | Agrawal et al. |
| 5,651,098 | A | 7/1997 | Inoue et al. |
| 5,654,098 | A | 8/1997 | Aono et al. |
| 5,687,369 | A | 11/1997 | Li |
| 5,704,017 | A | 12/1997 | Heckerman et al. |
| 5,717,865 | A | 2/1998 | Stratmann |
| 5,724,567 | A | 3/1998 | Rose et al. |
| 5,734,890 | A | 3/1998 | Case et al. |
| 5,754,938 | A | 5/1998 | Herz et al. |
| 5,819,245 | A | 10/1998 | Peterson et al. |
| 5,884,282 | A | 3/1999 | Robinson |
| 5,893,098 | A | 4/1999 | Peters et al. |
| 5,913,204 | A | 6/1999 | Kelly |
| 5,918,014 | A | 6/1999 | Robinson |
| 5,930,780 | A | 7/1999 | Hughes et al. |
| 5,974,396 | A | 10/1999 | Anderson et al. |
| 5,995,951 | A | 11/1999 | Ferguson |
| 6,012,051 | A | 1/2000 | Sammon, Jr. et al. |
| 6,029,139 | A | 2/2000 | Cunningham et al. |
| 6,041,311 | A | 3/2000 | Chislenko et al. |
| 6,064,980 | A | 5/2000 | Jacobi et al. |
| 6,064,996 | A | 5/2000 | Yamaguchi et al. |
| 6,070,145 | A | 5/2000 | Pinsley et al. |
| 6,078,740 | A | 6/2000 | DeTreville |
| 6,078,922 | A | 6/2000 | Johnson et al. |
| 6,088,510 | A | 7/2000 | Sims |
| 6,092,069 | A | 7/2000 | Johnson et al. |
| 6,093,026 | A | 7/2000 | Walker et al. |
| 6,098,048 | A | 8/2000 | Dashefsky et al. |
| 6,115,700 | A | 9/2000 | Ferkinhoff et al. |
| 6,125,351 | A | 9/2000 | Kauffman |
| 6,151,585 | A | 11/2000 | Altschuler et al. |
| 6,155,839 | A | 12/2000 | Clark et al. |
| 6,167,445 | A | 12/2000 | Gai et al. |
| 6,175,833 | B1 | 1/2001 | West et al. |
| 6,185,559 | B1 | 2/2001 | Brin et al. |
| 6,202,058 | B1 | 3/2001 | Rose et al. |
| 6,233,564 | B1 | 5/2001 | Schulze, Jr. |
| 6,236,977 | B1 | 5/2001 | Verba et al. |
| 6,249,714 | B1 | 6/2001 | Hocaoglu et al. |
| 6,266,649 | B1 | 7/2001 | Linden et al. |
| 6,281,651 | B1 | 8/2001 | Haanpaa et al. |
| 6,304,861 | B1 | 10/2001 | Ferguson |
| 6,366,890 | B1 | 4/2002 | Usrey |
| 6,380,928 | B1 | 4/2002 | Todd |
| 6,385,620 | B1 | 5/2002 | Kurzius et al. |
| 6,438,579 | B1 | 8/2002 | Hosken |
| 6,460,036 | B1 | 10/2002 | Herz |
| 6,477,504 | B1 | 11/2002 | Hamlin et al. |
| 6,484,158 | B1 | 11/2002 | Johnson et al. |
| 6,546,380 | B1 | 4/2003 | Lautzenheiser et al. |
| 6,574,585 | B2 | 6/2003 | Caruso et al. |
| 6,629,097 | B1 | 9/2003 | Keith |
| 6,636,862 | B2 | 10/2003 | Lundahl et al. |
| 6,741,967 | B1 | 5/2004 | Wu et al. |
| 6,754,635 | B1 | 6/2004 | Hamlin et al. |
| 6,778,807 | B1 | 8/2004 | Martino et al. |
| 6,826,541 | B1 | 11/2004 | Johnston et al. |
| 6,839,680 | B1 | 1/2005 | Liu et al. |
| 6,859,782 | B2 | 2/2005 | Harshaw |
| 6,873,965 | B2 | 3/2005 | Feldman et al. |
| 6,895,388 | B1 | 5/2005 | Smith |
| 6,901,424 | B1 | 5/2005 | Winn |
| 6,915,269 | B1 | 7/2005 | Shapiro et al. |
| 6,934,748 | B1 | 8/2005 | Louviere et al. |
| 6,944,514 | B1 | 9/2005 | Matheson |
| 6,993,495 | B2 | 1/2006 | Smith, Jr. et al. |
| 6,999,987 | B1 | 2/2006 | Billingsley et al. |
| 7,016,882 | B2 | 3/2006 | Afeyan et al. |
| 7,054,828 | B2 | 5/2006 | Heching et al. |
| 7,058,590 | B2 | 6/2006 | Shan |
| 7,082,426 | B2 * | 7/2006 | Musgrove ......... G06F 16/24575 715/204 |
| 7,113,917 | B2 * | 9/2006 | Jacobi ............... G06Q 30/0255 705/14.67 |
| 7,114,163 | B2 | 9/2006 | Hardin et al. |
| 7,117,163 | B1 | 10/2006 | Iyer et al. |
| 7,177,851 | B2 | 2/2007 | Afeyan et al. |
| 7,197,485 | B2 | 3/2007 | Fuller |
| 7,233,914 | B1 | 6/2007 | Wijaya et al. |
| 7,249,044 | B2 | 7/2007 | Kumar et al. |
| 7,269,570 | B2 | 9/2007 | Krotki |
| 7,281,655 | B2 | 10/2007 | Wagner et al. |
| 7,302,475 | B2 | 11/2007 | Gold et al. |
| 7,308,418 | B2 | 12/2007 | Malek et al. |
| 7,337,127 | B1 | 2/2008 | Smith et al. |
| 7,359,913 | B1 | 4/2008 | Ordonez |
| 7,398,223 | B2 | 7/2008 | Kahlert et al. |
| 7,610,249 | B2 | 10/2009 | Afeyan et al. |
| 7,630,986 | B1 | 12/2009 | Herz et al. |
| 7,698,163 | B2 | 4/2010 | Reed et al. |
| 7,711,580 | B1 | 5/2010 | Hudson |
| 7,720,720 | B1 | 5/2010 | Sharma et al. |
| 7,730,002 | B2 | 6/2010 | Afeyan et al. |
| 7,836,057 | B1 | 11/2010 | Micaelian et al. |
| 7,860,776 | B1 | 12/2010 | Chin et al. |
| 7,877,346 | B2 | 1/2011 | Karty |
| 7,912,898 | B2 | 3/2011 | Gold et al. |
| 8,027,864 | B2 | 9/2011 | Gilbert |
| 8,082,519 | B2 | 12/2011 | Oron et al. |
| 8,103,540 | B2 | 1/2012 | Gross |
| 8,117,199 | B2 | 2/2012 | Ghani et al. |
| 8,150,795 | B2 | 4/2012 | Montgomery, Jr. et al. |
| 8,234,152 | B2 | 7/2012 | Jepson et al. |
| 8,407,081 | B1 * | 3/2013 | Rajasenan .......... G06Q 10/0639 705/7.42 |
| 8,543,446 | B2 | 9/2013 | Richardson et al. |
| 8,620,717 | B1 | 12/2013 | Micaelian et al. |
| 8,694,372 | B2 | 4/2014 | Eyal et al. |
| 8,868,446 | B2 | 10/2014 | Lamoureux et al. |
| 8,868,448 | B2 | 10/2014 | Freishtat et al. |
| 9,111,298 | B2 | 8/2015 | Lamoureux et al. |
| 9,208,132 | B2 | 12/2015 | DeBlois et al. |
| 9,208,515 | B2 | 12/2015 | Lamoureux et al. |
| 9,218,614 | B2 | 12/2015 | Lamoureux et al. |
| 9,262,776 | B2 | 2/2016 | Lamoureux et al. |
| 9,311,383 | B1 | 4/2016 | Karty et al. |
| RE46,178 | E | 10/2016 | Afeyan et al. |
| 9,785,995 | B2 | 10/2017 | Malek et al. |
| 9,799,041 | B2 | 10/2017 | Karty et al. |
| 10,147,108 | B2 | 12/2018 | Ayzenshtat et al. |
| 10,354,263 | B2 | 7/2019 | Wagner |
| 10,621,203 | B2 | 4/2020 | Hunt et al. |
| 10,796,321 | B1 | 10/2020 | Balakrishnan et al. |
| 10,909,560 | B2 | 2/2021 | Ayzenshtat et al. |
| 11,037,179 | B2 | 6/2021 | Wagner |
| 2001/0013009 | A1 | 8/2001 | Greening et al. |
| 2001/0032128 | A1 | 10/2001 | Kepecs |
| 2002/0002482 | A1 | 1/2002 | Thomas |
| 2002/0016731 | A1 | 2/2002 | Kupersmit |

(56) References Cited

U.S. PATENT DOCUMENTS

| | | |
|---|---|---|
| 2002/0046128 A1 | 4/2002 | Abe et al. |
| 2002/0052774 A1 | 5/2002 | Parker et al. |
| 2002/0077881 A1 | 6/2002 | Krotki |
| 2002/0087388 A1 | 7/2002 | Keil et al. |
| 2002/0107852 A1 | 8/2002 | Oblinger |
| 2002/0128898 A1 | 9/2002 | Smith, Jr. et al. |
| 2002/0133502 A1 | 9/2002 | Rosenthal et al. |
| 2002/0152110 A1 | 10/2002 | Stewart et al. |
| 2002/0161664 A1 | 10/2002 | Shaya et al. |
| 2002/0169727 A1 | 11/2002 | Melnick et al. |
| 2003/0004781 A1 | 1/2003 | Mallon et al. |
| 2003/0014291 A1 | 1/2003 | Kane et al. |
| 2003/0018517 A1 | 1/2003 | Dull et al. |
| 2003/0074369 A1 | 4/2003 | Schuetze et al. |
| 2003/0078900 A1 | 4/2003 | Dool |
| 2003/0088457 A1 | 5/2003 | Keil et al. |
| 2003/0088458 A1 | 5/2003 | Afeyan et al. |
| 2003/0140012 A1 | 7/2003 | Harvey et al. |
| 2003/0187708 A1 | 10/2003 | Baydar et al. |
| 2003/0002333 A1 | 12/2003 | Yanase et al. |
| 2004/0123247 A1 | 6/2004 | Wachen et al. |
| 2004/0133468 A1 | 7/2004 | Varghese |
| 2004/0181461 A1 | 9/2004 | Raiyani et al. |
| 2004/0199923 A1 | 10/2004 | Russek |
| 2004/0204957 A1 | 10/2004 | Afeyan et al. |
| 2004/0210471 A1 | 10/2004 | Luby et al. |
| 2004/0236625 A1 | 11/2004 | Kearon |
| 2004/0249719 A1 | 12/2004 | Urpani |
| 2004/0267604 A1 | 12/2004 | Gross |
| 2005/0004819 A1 | 1/2005 | Etzioni et al. |
| 2005/0060222 A1 | 3/2005 | White |
| 2005/0075919 A1 | 4/2005 | Kim |
| 2005/0131716 A1 | 6/2005 | Hanan et al. |
| 2005/0197988 A1 | 9/2005 | Bublitz |
| 2005/0203807 A1 | 9/2005 | Bezos et al. |
| 2005/0209909 A1 | 9/2005 | Dull et al. |
| 2005/0261953 A1 | 11/2005 | Malek et al. |
| 2006/0004621 A1 | 1/2006 | Malek et al. |
| 2006/0080265 A1 | 4/2006 | Hinds et al. |
| 2006/0080268 A1 | 4/2006 | Afeyan et al. |
| 2006/0106656 A1 | 5/2006 | Ouimet |
| 2006/0112099 A1 | 5/2006 | Musgrove et al. |
| 2006/0136293 A1 | 6/2006 | Kasravi |
| 2006/0149616 A1 | 7/2006 | Hildick-Smith |
| 2006/0212355 A1 | 9/2006 | Teague et al. |
| 2006/0247956 A1 | 11/2006 | Rosen et al. |
| 2006/0259344 A1 | 11/2006 | Patel et al. |
| 2007/0067212 A1 | 3/2007 | Bonabeau |
| 2007/0067213 A1 | 3/2007 | Brown |
| 2007/0094066 A1 | 4/2007 | Kumar et al. |
| 2007/0094067 A1 | 4/2007 | Kumar et al. |
| 2007/0100680 A1 | 5/2007 | Kumar et al. |
| 2007/0192166 A1 | 8/2007 | Van Luchene |
| 2007/0203783 A1 | 8/2007 | Beltramo |
| 2007/0218834 A1 | 9/2007 | Yogev et al. |
| 2007/0222793 A1 | 9/2007 | Olhofer et al. |
| 2007/0226073 A1 | 9/2007 | Wang |
| 2007/0241944 A1 | 10/2007 | Coldren et al. |
| 2007/0282666 A1 | 12/2007 | Afeyan et al. |
| 2008/0065471 A1 | 3/2008 | Reynolds et al. |
| 2008/0077901 A1 | 3/2008 | Arsintescu |
| 2008/0086364 A1 | 4/2008 | Hahn et al. |
| 2008/0091510 A1 | 4/2008 | Crandall et al. |
| 2008/0114564 A1 | 5/2008 | Ihara |
| 2008/0140507 A1 | 6/2008 | Hamlisch et al. |
| 2008/0147483 A1 | 6/2008 | Ji |
| 2008/0162268 A1 | 7/2008 | Gilbert |
| 2008/0208659 A1 | 8/2008 | An et al. |
| 2008/0243637 A1 | 10/2008 | Chan et al. |
| 2008/0256011 A1 | 10/2008 | Rice |
| 2008/0270398 A1 | 10/2008 | Landau et al. |
| 2008/0306895 A1 | 12/2008 | Karty |
| 2008/0319829 A1 | 12/2008 | Hunt et al. |
| 2009/0006156 A1 | 1/2009 | Hunt et al. |
| 2009/0006184 A1 | 1/2009 | Leach et al. |
| 2009/0018996 A1 | 1/2009 | Hunt et al. |
| 2009/0076887 A1 | 3/2009 | Spivack et al. |
| 2009/0089273 A1 | 4/2009 | Hicks |
| 2009/0150213 A1 | 6/2009 | Cyr et al. |
| 2009/0222325 A1 | 9/2009 | Anderson et al. |
| 2009/0231356 A1 | 9/2009 | Barnes et al. |
| 2009/0234710 A1 | 9/2009 | Belgaied Hassine et al. |
| 2009/0248483 A1 | 10/2009 | Kiefer |
| 2009/0254971 A1 | 10/2009 | Herz et al. |
| 2009/0282482 A1 | 11/2009 | Huston |
| 2009/0287728 A1 | 11/2009 | Martine et al. |
| 2009/0307055 A1 | 12/2009 | Karty |
| 2010/0010893 A1 | 1/2010 | Rajaraman et al. |
| 2010/0063869 A1 | 3/2010 | Kriss |
| 2010/0082441 A1 | 4/2010 | Doemling et al. |
| 2010/0121777 A1 | 5/2010 | McGonigal et al. |
| 2010/0125541 A1 | 5/2010 | Wendel et al. |
| 2010/0205034 A1 | 8/2010 | Zimmerman et al. |
| 2010/0280877 A1* | 11/2010 | Shelton .............. G06Q 30/02 705/7.29 |
| 2010/0306028 A1 | 12/2010 | Wagner |
| 2010/0306249 A1 | 12/2010 | Hill et al. |
| 2010/0313119 A1 | 12/2010 | Baldwin et al. |
| 2010/0318916 A1 | 12/2010 | Wilkins |
| 2011/0071874 A1 | 3/2011 | Schneersohn et al. |
| 2011/0078004 A1 | 3/2011 | Swanson, Sr. |
| 2011/0087679 A1 | 4/2011 | Rosato et al. |
| 2011/0125591 A1 | 5/2011 | Evans |
| 2011/0261049 A1 | 10/2011 | Cardno et al. |
| 2011/0302494 A1 | 12/2011 | Callery |
| 2012/0072409 A1* | 3/2012 | Perry ............... G06Q 30/0603 707/E17.108 |
| 2012/0116843 A1 | 5/2012 | Karty |
| 2012/0209677 A1 | 8/2012 | Mehta et al. |
| 2012/0209723 A1 | 8/2012 | Satow et al. |
| 2012/0226559 A1* | 9/2012 | Baum ................ G06Q 30/02 705/14.66 |
| 2012/0229500 A1 | 9/2012 | Lamoureux et al. |
| 2012/0232850 A1 | 9/2012 | Lamoureux et al. |
| 2012/0232851 A1 | 9/2012 | Lamoureux et al. |
| 2012/0232852 A1 | 9/2012 | Lamoureux et al. |
| 2012/0233037 A1 | 9/2012 | Lamoureux et al. |
| 2012/0259676 A1 | 10/2012 | Wagner |
| 2013/0060662 A1 | 3/2013 | Carlson et al. |
| 2013/0268346 A1 | 10/2013 | Walker et al. |
| 2013/0282506 A1 | 10/2013 | Altschuler |
| 2013/0325653 A1 | 12/2013 | Ouimet |
| 2014/0172543 A1 | 6/2014 | Eyal et al. |
| 2014/0278799 A1 | 9/2014 | McLean |
| 2014/0279203 A1 | 9/2014 | Malek et al. |
| 2014/0279233 A1* | 9/2014 | Lau ................. G06Q 30/0201 705/26.41 |
| 2014/0344013 A1 | 11/2014 | Karty et al. |
| 2015/0088609 A1 | 3/2015 | Wagner |
| 2015/0134401 A1 | 5/2015 | Heuer et al. |
| 2015/0193853 A1 | 7/2015 | Ayzenshtat et al. |
| 2016/0239882 A1 | 8/2016 | Garcia |
| 2016/0260153 A1 | 9/2016 | Gerard et al. |
| 2016/0292705 A1 | 10/2016 | Ayzenshtat et al. |
| 2017/0161757 A1 | 6/2017 | Zenor et al. |
| 2018/0033071 A1 | 2/2018 | Malek et al. |
| 2018/0068327 A1 | 3/2018 | Wagner |
| 2018/0268427 A1 | 9/2018 | Zimmerman et al. |
| 2018/0365709 A1 | 12/2018 | Modani et al. |
| 2020/0005338 A1 | 1/2020 | Wagner |
| 2021/0150552 A1 | 5/2021 | Ayzenshtat et al. |
| 2021/0233096 A1 | 7/2021 | Zenor |
| 2021/0374772 A1 | 12/2021 | Wagner |

FOREIGN PATENT DOCUMENTS

| | | |
|---|---|---|
| JP | 2002092291 | 3/2002 |
| JP | 2002117204 | 4/2002 |
| JP | 2002215870 | 8/2002 |
| JP | 2003030537 | 1/2003 |
| KR | 20100082650 | 5/2011 |
| WO | 0002138 | 1/2000 |
| WO | 02057986 | 7/2002 |

(56) References Cited

FOREIGN PATENT DOCUMENTS

| WO | 2005116896 | | 12/2005 | | |
| --- | --- | --- | --- | --- | --- |
| WO | 2006012122 | | 2/2006 | | |
| WO | 2006024108 | | 3/2006 | | |
| WO | 2008022341 | | 2/2008 | | |
| WO | 2008092149 | | 7/2008 | | |
| WO | 2010055017 | | 5/2010 | | |
| WO | WO-2012030400 | A1 * | 3/2012 | ......... | G06Q 30/0631 |
| WO | 2014143729 | | 9/2014 | | |
| WO | WO-2014190231 | A1 * | 11/2014 | ............ | A61B 3/113 |

OTHER PUBLICATIONS

Han et al., "Mining Frequent Patterns without Candidate Generation: A Frequent-Pattern Tree Approach," Data Mining and Discovery, vol. 8, 2004, 35 pages.

Kotsiantis et al., "Association Rules Mining: A Recent Overview," GESTS International Transactions on Computer Science and Engineering, vol. 23, No. 1, 2006, 12 pages.

Nguyen, "Finding Your Best Customer: A Guide to Best Current B2B Customer Segmentation," Openview Venture Partners, Oct. 3, 2012, 44 pages. Retrieved on Feb. 20, 2015, from http://labs.openviewpartners.com/customer-segmentation.

Pei et al., "Closet: An Efficient Algorithm for Mining Frequent Closed Itemsets," Intellectual Database Systems Research Lab, School of Computing Science, Simon Fraser University, 2000, 10 pages.

United States Patent and Trademark Office, "Requirement for Restriction/Election," mailed in connection with U.S. Appl. No. 14/148,266, dated Feb. 17, 2015, 6 pages.

United States Patent and Trademark Office, "Non-final Office Action," mailed in connection with U.S. Appl. No. 14/148,266, dated Jun. 24, 2015, 20 pages.

Wasilewska, "Apriori Algorithm Lecture Notes," 2007, 23 pages. Retrieved on Apr. 2, 2014, from http://www.academia.edu/5428474/APRIORI_Algorithm.

Zheng et al., "Real World Performance of Association Rule Algorithms," Blue Martini Software, 2001, 14 pages.

Kamakura, "Sequential Market Basket Analysis," Springer Science + Business Media, LLC,May 22, 2012, 12 pages.

United States Patent and Trademark Office, "Non-final Office Action," mailed in connection with U.S. Appl. No. 14/821,363, dated Feb. 9, 2018, 22 pages.

United States Patent and Trademark Office, "Notice of Allowance," mailed in connection with U.S. Appl. No. 14/821,363, dated Jul. 31, 2018, 49 pages.

United States Patent and Trademark Office, "Notice of Allowance," mailed in connection with U.S. Appl. No. 16/180,812, dated Sep. 25, 2020, 10 pages.

United States Patent and Trademark Office, "Final Office Action," mailed in connection with U.S. Appl. No. 16/180,812, dated Jun. 1, 2020, 7 pages.

United States Patent and Trademark Office, "Non-final Office Action," mailed in connection with U.S. Appl. No. 16/180,812, dated Nov. 29, 2019, 9 pages.

"Chapter 7: Sampling in Market Research," retrieved from <http://web.archive.org/web/20050313042847/http://www.fao.org/docrep/w3241c/w3241e08.htm>, retrieved on Apr. 22, 2013 (29 pages).

"Sampling Techniques." Oct. 2003, retrieved from <http://web.archive.org/web/20031031223726/http://cs.fit.edu/~jpmcgee/classes/CSE5800/SamplingTechniques.pdf>, retrieved on Apr. 22, 2013 (12 pages).

Adomavicius et al., "Toward the Next Generation of Recommender Systems: A Survey of the State-of-the-Art and Possible Extensions," IEEE Transactions on Knowledge and Data Engineering, vol. 17. No. 6, Jun. 2005, pp. 734-749 (16 pages).

Anthony, Cynthia S., "Electronic Monitoring Legislation for Businesses with Call Centers is Fraught with Problems," Telecommunications, ABI/INFORM Global, vol. 28, No. 3, Mar. 1994 (1 page).

Arsham, Hossein, "Questionnaire Design and Surveys Sampling," Mar. 4, 2004, retrieved from <http://web.archive.org/web/20040304232826/http://home.ubalt.edu/ntsbarsh/statdata/Surveys.htm>, retrieved on Apr. 22, 2013 (15 pages).

Balakrishnan et al., "Genetic Algorithm for Product Design," Management Science, vol. 42, No. 8. Aug. 1996, pp. 1105-1117 (13 pages).

Bartlett II, et al., "Organizational Research: Determining Appropriate Sample Size in Survey Research," Information Technology, Learning, and Performance Journal, vol. 19, No. 1, Spring 2001, pp. 43-50 (8 pages).

Brown et al., "Restricted Adaptive Cluster Sampling," Environmental and Ecological Statistics, vol. 5, 1998, pp. 49-63 (15 pages).

Cabena et al., "Intelligent Miner for Data Applications Guide," IBM, Redbook, SG24-5252-00, Mar. 1999 (175 pages). (NPL in 2 parts).

Callery et al., "Smart Presentation Application," U.S. Appl. No. 61/351,486, filed Jun. 4, 2010, as incorporated by reference in U.S. PG Publication 2011/0302494 (50 pages).

Canadian Intellectual Property Office, "Examiner's Report," issued in connection with Canadian Patent Application No. 2,428,079, dated Sep. 8, 2014 (2 pages).

Canadian Intellectual Property Office, "Examiner's Report," issued in connection with Canadian Patent Application No. 2,566,943, dated Oct. 17, 2013 (4 pages).

Cattin et al., "Commercial Use of Conjoint Analysis: A Survey," Journal of Marketing, vol. 46, Summer 1982, pp. 44-53 (8 pages).

Chen, Doris Tung, "Network Monitoring and Analysis in a Large Scale PACS and Teleradiology Environment," AAT 9620717, University of California, 1996, Abstract Only, Abstract retrieved from <http://proquest.umi.com/pqdweb?index=3&did=74184...D&RQT=309&VName=PQD&TS=1235762960&clientId=19649>, retrieved on Feb. 27, 2009 (2 pages).

Dahan et al., "The Predictive Power of Internet-Based Product Concept Testing Using Visual Depiction and Animation," Journal of Production Innovation Management, vol. 17, 2000, pp. 99-109 (11 pages).

Desmond et al., "Smart Office Tools Presentation," IBM Research, Oct. 18, 2010, retrieved from <http://ics.uci.edu/' nlopezgi/flexitools/presentations/desmond_flexitools_splash2010.pdf> (22 pages).

Desmond et al., "Towards Smart Office Tools," 2010, retrieved from <http://http://www.ics.uci.edu/~nlopezgi/flexitools/papers/desmond_flexitools_splash2010.pdf> (4 pages).

DSS Research, "A Review of Conjoint Analysis," DSS Research, retrieved from <http://www.conjoint.com/CR01.aspx>, retrieved on Feb. 26, 2015 (6 pages).

Ellis et al., "Comparing Telephone and Face-to-Face Surveys in Terms of Sample Representativeness: A Meta-Analysis of Demographic Characteristics," Ohio State University, Apr. 1999 (61 pages).

Environmental Protection Agency, "Guidance on Choosing a Sampling Design for Environmental Data Collection," EPA QA/G-5S, Dec. 2002 (178 pages). (NPL in 2 parts).

European Patent Office, "Supplemental Search Report," issued in connection with European Patent Application No. 05753821.7, dated Dec. 17, 2009 (2 pages).

European Patent Office, "Proceeding further with the European patent application pursuant to Rule 70(2) EPC," issued in connection with European Patent Application No. 05753821.7, dated Jan. 4, 2010 (1 page).

European Patent Office, "Communication Pursuant to Article 94(3) EPC," issued in connection with European Patent Application No. 05753821.7, dated Feb. 5, 2013 (5 pages).

Fienberg, Stephen E."Notes on Stratified Sampling (for Statistics 36-303: Sampling, Surveys and Society)," Department of Statistics, Carnegie Mellon University, Mar. 12, 2003 (12 pages).

Fly, "Swap an Image in PowerPoint 2007 with Ease," CGI Interactions, Dec. 23, 2010, retrieved from <http://cgiinteractive.com/blog2010/12/swap-change-image-powerpoint-2007-case/feed/> (3 pages).

(56) References Cited

OTHER PUBLICATIONS

Garcia, Fernando D.,"Computer Screen Design Aided by a Genetic Algorithm," Late Breaking Papers at the 2000 Genetic and Evolutionary Computation Conference, Whitley, D. ed. 2000, pp. 98-101 (4 pages).
Government of India Patent Office, "First Examination Report," issued in connection with Indian Patent Application No. 3684/KOLNP/2006, dated Mar. 14, 2011 (2 pages).
Graf et al., "Interactive Evolution of Images," Evolutionary Programming IV—Proc. Fourth Annual Conference—Evolutionary Programming, MIT Press, Cambridge MA, 1995, pp. 53-65 (13 pages).
Gu et al., "Sampling and Its Application in Data Mining: A Survey," National University of Singapore, Singapore, Jun. 1, 2000 (31 pages).
Gu et al., "Sampling: Knowing Whole From its Part," Instance Selection and Construction for Data Mining, Chapter 2, May 2, 2001 (32 pages).
Haupt et al., "Practical Genetic Algorithms," 1998, pp. 66-70 and 85-88 (10 pages).
International Searching Authority, "International Preliminary Report on Patentability," issued in connection with International Patent Application No. PCT/US2001/51284, dated Sep. 29, 2008 (3 pages).
International Searching Authority, "International Preliminary Report on Patentability," issued in connection with International Patent Application No. PCT/US2005/021948, dated Jan. 9, 2007 (8 pages).
International Searching Authority, "International Search Report," issued in connection with International Patent Application No. PCT/US2005/021948, dated Nov. 13, 2006 (2 pages).
International Searching Authority, "Written Opinion," issued in connection with International Patent Application No. PCT/US2005/021948, dated Nov. 13, 2006 (7 pages).
International Searching Authority, "International Preliminary Report on Patentability," issued in connection with International Patent Application No. PCT/US2005/17179, dated Jan. 30, 2007 (4 pages).
International Searching Authority, "International Search Report," issued in connection with International Patent Application No. PCT/US2005/17179, dated Jan. 16, 2007 (4 pages).
International Searching Authority, "Written Opinion," issued in connection with International Patent Application No. PCT/US2005/17179, dated Jan. 16, 2007 (3 pages).
International Searching Authority, "Written Opinion," issued in connection with International Patent Application No. PCT/US2012/028364, dated Jul. 11, 2012 (4 pages).
International Searching Authority, "International Search Report," issued in connection with International Patent Application No. PCT/US2012/028364, dated Jul. 11, 2012 (4 pages).
International Searching Authority, "International Search Report," issued in connection with International Patent Application No. PCT/US2012/028369, dated Jul. 11, 2012 (4 pages).
International Searching Authority, "International Preliminary Report on Patentability," issued in connection with International Patent Application No. PCT/US2012/028369, dated Sep. 10, 2013 (6 pages).
International Searching Authority, "Written Opinion," issued in connection with International Patent Application No. PCT/US2012/028369, dated Jul. 11, 2012 (5 pages).
International Searching Authority, "International Preliminary Report on Patentability," issued in connection with International Patent Application No. PCT/US2012/028373, dated Sep. 10, 2013 (6 pages).
International Searching Authority, "International Search Report," issued in connection with International Patent Application No. PCT/US2012/028373, dated Jul. 6, 2012 (4 pages).
International Searching Authority, "Written Opinion," issued in connection with International Patent Application No. PCT/US2012/028373, dated Jul. 6, 2012 (5 pages).
International Searching Authority, "Written Opinion," issued in connection with International Patent Application No. PCT/US2012/028375, dated Jul. 6, 2012 (5 pages).
International Searching Authority, "International Preliminary Report on Patentability," issued in connection with International Patent Application No. PCT/US2012/028375, dated Sep. 10, 2013 (6 pages).
International Searching Authority, "International Search Report," issued in connection with International Patent Application No. PCT/US2012/028375, dated Jul. 6, 2012 (4 pages).
International Searching Authority, "International Preliminary Report on Patentability," issued in connection with International Patent Application No. PCT/US2012/028376, dated Sep. 19, 2013 (7 pages).
International Searching Authority, "International Search Report," issued in connection with International Patent Application No. PCT/US2012/028376, dated Jul. 9, 2012 (4 pages).
International Searching Authority, "Written Opinion," issued in connection with International Patent Application No. PCT/US2012/028376, dated Jul. 9, 2012 (5 pages).
Istockphoto, "iStockphoto Announces Plug-in That Allows Users of Microsoft PowerPoint and Word to Download iStock Photos and Illustrations Directly into Presentations and Documents," istockphoto, retrieved from <http://www.istockphoto.com/istockphoto-office-ribbon>, May 17, 2010 (4 pages).
Jacobs, Richard M., "Educational Research: Sampling a Population," EDU 8603, 2003 (89 pages).
Japan Patent Office, "Notice of Reasons for Rejection," issued in connection with Japanese Patent Application No. P2013-236441, dated Feb. 25, 2015 (4 pages).
Johnston, "Why We Feel: The Science of Human Emotions," Perseus Books, Cambridge MA, 1999, pp. 152-155 (4 pages).
Kaye et al., "Research Methodology: Taming the Cyber Frontier-Techniques for Improving Online Surveys," Social Science Computer Review, vol. 17. No. 3, Fall 1999. pp. 323-337 (16 pages).
Kim et al., "Application of Interactive Genetic Algorithm to Fashion Design," Engineering Applications of Artificial Intelligence, vol. 13, 2000, pp. 635-644 (10 pages).
Kim et al., "Knowledge-Based Encoding in Interactive Genetic Algorithm for a Fashion Design Aid System," Genetic and Evolutionary Computation Conference, Jul. 10-12, 2000, p. 757 (4 pages).
Lunsford et al., "Research Forum—The Research Forum Sample—Part 1: Sampling," Journal of Prosthetics and Orthotics, vol. 7, No. 3, 1995, retrieved from <http://www.oandp.org/jpo/library/printArticle.asp?printArticleId=1995_03_105>, retrieved on Feb. 26, 2015 (10 pages).
Medina, Martin Humberto Felix, "Contributions to the Theory of Adaptive Sampling, Doctorate Thesis in Statistics," The Pennsylvania State University, Dec. 2000 (259 pages). (NPL in 2 parts).
O'Reilly et al., "A Preliminary Investigation of Evolution as a Form Design Strategy," Artificial Life VI, MIT Press, Cambridge MA, 1998 (5 pages).
O'Reilly et al., "Evolution as a Design Strategy for Nonlinear Architecture: Generative Modeling of 3D Surfaces," 1998 (10 pages).
Ossher et al., "Flexible Modeling Tools for Pre-Requirements Analysis: Conceptual Architecture and Research Challenges," ACM SIGPLAN Notices—OOPSLA-10, vol. 45, Issue 10, Oct. 2010, pp. 848-864 (17 pages).
Ossher et al., "Using Tagging to Identify and Organize Concerns During Pre-Requirements Analysis," Aspect-Oriented Requirements Engineering and Architecture Design, 2009, EA'09, ICSE Workshop, May 18, 2009, pp. 25-30 (6 pages).
Pazzani, Michael J., "A Framework for Collaborative, Content-Based and Demographic Filtering," Artificial Intelligence Review, vol. 13, 2000, pp. 393-408 (16 pages).
Reynolds, Reid T. "How Big is Big Enough?" American Demographics, Abstract Only, vol. 2, No. 4, Apr. 1980, Abstract retrieved from <http://search.proquest.com/printviewfile?accountid=14753>, retrieved on Apr. 22, 2013 (2 pages).
Rowland, Duncan Andrew, "Computer Graphic Control Over Human Face and Head Appearance, Genetic Optimization of Perceptual Characteristics," Ph.D. Thesis, University of St. Andrews, Scotland, Jan. 5, 1998, retrieved from <http://www.mindlab.msu.edu/documents/Thesis_Rowland/title.htm>, retrieved on May 12, 2000 (101 pages).

(56) References Cited

OTHER PUBLICATIONS

Sage Publishing, "Chapter 5: Sampling," retrieved from <http://sagepub.com/upm-data/24480_Ch5.pdf> pp. 148-189 (42 pages).
Sims, Karl. "Artificial Evolution for Computer Graphics," Computer Graphics, vol. 25, No. 4, Jul. 1991. pp. 319-328 (22 pages).
Steiner et al., "A Probabilistic One-Step Approach to the Optimal Product Line Design Problem Using Conjoint and Cost Data," Review of Marketing Science Working Papers, vol. 1, No. 4, Working Paper 4, 2002, pp. 1-40 (41 pages).
Su et al., "An Internet-Based Negotiation Server for E-Commerce," The VLDB Joural—The International Journal on Very Large Data Bases, vol. 10, Issue 1, Aug. 2001. pp. 72-90 (20 pages).
Swain et al., "Webseer: an Image Search Engine for the World Wide Web," Technical Report, University of Chicago, 1996 retrieved from <http://citeseerx.ist.psu.edu/viewdoc/download?doi=10.1.1.44.9234&rep=rep1&type=pdf> (8 pages).
Thompson, Steven K., "Design and Inference in Adaptive Sampling," SSC Annual Meeting, Proceedings of the Survey Methods Section, Jun. 1997 (5 pages).
Thompson Steven K., "Stratified Adaptive Cluster Sampling," Abstract Only, Biometrika, vol. 78, No. 2. 1991 (1 page).
United States Patent and Trademark Office, "Advisory Action" issued in connection with U.S. Appl. No. 12/368,028, dated Sep. 29, 2014 (3 pages).
United States Patent and Trademark Office, "Non-Final Office Action" issued in connection with U.S. Appl. No. 13/740,699, dated Jul. 18, 2014 (16 pages).
United States Patent and Trademark Office, "Non-Final Office Action," issued in connection with U.S. Appl. No. 11/758,877, dated Mar. 8, 2010 (25 pages).
United States Patent and Trademark Office, "Supplemental Notice of Allowance," issued in connection with U.S. Appl. No. 10/852,356, dated Oct. 22, 2007 (3 pages).
United States Patent and Trademark Office. "Supplemental Notice of Allowance," issued in connection with U.S. Appl. No. 10/852,356, dated Sep. 4, 2007 (3 pages).
United States Patent and Trademark Office, "Notice of Allowance," issued in connection with U.S. Appl. No. 11/758,877, dated Sep. 22, 2010 (6 pages).
United States Patent and Trademark Office, "Notice of Allowance," issued in connection with U.S. Appl. No. 10/852,356, dated Jul. 19, 2007 (22 pages).
United States Patent and Trademark Office, "Non-Final Office Action," issued in comrection with U.S. Appl. No. 10/852,356, dated Jan. 3, 2007 (11 pages).
United States Patent and Trademark Office, "Non-Final Office Action," issued in connection with U.S. Appl. No. 10/053,353, dated Feb. 18, 2005 (10 pages).
United States Patent and Trademark Office, "Non-Final Office Action," issued in connection with U.S. Appl. No. 10/053,353, dated Oct. 17, 2005 (9 pages).
United States Patent and Trademark Office, "Notice of Allowance," issued in connection with U.S. Appl. No. 10/053,353, dated Nov. 8, 2006 (6 pages).
United States Patent and Trademark Office, "Non Final Office Action," issued in connection with U.S. Appl. No. 10/831,881, dated Jan. 6, 2005 (10 pages).
United States Patent and Trademark Office, "Notice of Allowance," issued in connection with U.S. Appl. No. 10/831,881, dated Aug. 4, 2005 (7 pages).
United States Patent and Trademark Office, "Notice of Allowance," issued in connection with U.S. Appl. No. 11/229,020, dated Mar. 17, 2009 (36 pages).
United States Patent and Trademark Office, "Notice of Allowance," issued in connection with U.S. Appl. No. 11/726,350, dated Jul. 13, 2009 (10 pages).
United States Patent and Trademark Office, "Non-Final Office Action," issued in connection with U.S. Appl. No. 13/282,321, dated Jul. 2, 2012 (40 pages).
United States Patent and Trademark Office, "Final Office Action," issued in connection with U.S. Appl. No. 13/282,321, dated Feb. 22, 2013 (47 pages).
United States Patent and Trademark Office, "Non-Final Office Action," issued in connection with U.S. Appl. No. 13/283,121, dated Sep. 20, 2012 (59 pages).
United States Patent and Trademark Office, "Final Office Action," issued in connection with U.S. Appl. No. 13/283,121, dated May 24, 2013 (69 pages).
United States Patent and Trademark Office, "Final Office Action," issued in connection with U.S. Appl. No. 13/283,495, dated Jan. 27, 2015 (34 pages).
United States Patent and Trademark Office, "Non-Final Office Action," issued in connection with U.S. Appl. No. 13/283,495, dated Jul. 10, 2012 (39 pages).
United States Patent and Trademark Office, "Non-Final Office Action," issued in connection with U.S. Appl. No. 13/283,495, dated Sep. 19, 2013 (50 pages).
United States Patent and Trademark Office, "Final Office Action," issued in connection with U.S. Appl. No. 13/283,495, dated Feb. 11, 2013 (46 pages).
United States Patent and Trademark Office, "Final Office Action" issued in connection with U.S. Appl. No. 13/740,699, dated Apr. 2, 2015 (18 pages).
Weinberger, Martin, "Getting the Quota Sample Right," Journal of Advertising Research, vol. 13, No. 5, Oct. 1973, pp. 69-72 (5 pages).
Wempen, Faithe, Microsoft PowerPoint 2010 Bible, Wiley Publishing. Inc., May 10, 2010 (819 pages). (NPL in 6 parts).
Wikipedia, "Sampling (statistics)," Oct. 24, 2005, retrieved from <http://en.wikipedia.org/wiki/Sampling_(statistics)>, retrieved on Oct. 26, 2005 (5 pages).
Witbrock et al., "Evolving Genetic Art," Evolutionary Design by Computers, 1999, pp. 251-259 (9 pages).
Bonabeau, Eric, "Agent-Based Modeling: Methods and Techniques for Simulating Human Systems," PNAS, vol. 99, Supp. 3, May 14, 2002 (8 pages).
Borgatti, Steven P., "Multidimensional Scaling," retrieved from <http://www.analytictech.com/borgatti/mds.htm>, retrieved on Sep. 8, 2010 (8 pages).
Buja et al., "Interactive Data Visualization with Multidimensional Scaling," The Wharton School, University of Pennsylvania, Mar. 29, 2004 (32 pages).
Cheng et al., "Testing for IIA in the Multinomial Logit Model," Sociological Methods & Research, vol. 35, No. 4, May 2007 (19 pages).
European Patent Office, "Examination Report," issued in connection with European Patent Application No. 10001340.8, dated Mar. 31, 2011 (5 pages).
European Patent Office, "Extended European Search Report," issued in connection with European Patent Application No. 10001340.8, dated May 31, 2010 (4 pages).
European Patent Office, "Notice from the European Patent Office," Official Journal of the European Patent Office, vol. 30, No. 11, Nov. 1, 2007, pp. 592-593, XPO007905525 ISSN: 0170-9291 (2 pages).
European Patent Office, "Summons to Attend Oral Proceedings Pursuant to Rule 115(1) EPC," issued in connection with European Patent Application No. 10001340.8, dated Feb. 10, 2012 (9 pages).
Fader et al., "Modeling Consumer Choice Among SKU's," Journal of Marketing Research, vol. 33, No. 4, Nov. 1996 (12 pages).
Guadagni et al., "A Logit Model of Brand Choice Calibrated on Scanner Data," Marketing Science, vol. 2, Issue 3, 1983 (2 pages).
Huber et al., "Market Boundaries and Product Choice: Illustrating Attraction and Substitution Effects," Journal of Consumer Research, Inc., vol. 10, No. 1, Jun. 1983 (15 pages).
International Searching Authority, "International Preliminary Report on Patentability," issued in connection with International Patent Application No. PCT/US2010/049645, dated Mar. 27, 2012 (5 pages).
International Searching Authority, "International Search Report," issued in connection with International Patent Application No. PCT/US2010/049645, dated Feb. 28, 2011 (2 pages).

(56) References Cited

OTHER PUBLICATIONS

International Searching Authority, "Written Opinion," issued in connection with International Patent Application No. PCT/US2010/049645, dated Feb. 28, 2011 (4 pages).

Kahn et al., "Modeling Choice Among Assortments," Journal of Retailing, vol. 67, No. 3, Fall 1991 (26 pages).

Koppelmann et al., " The Paired Combinatorial Logit Model: Properties, Estimation and Application," Transportation Research Part B, 34, 2000 (15 pages).

Riedesel, Paul, "A Brief Introduction to Discrete Choice Analysis in Marketing Research," Action Marketing Research, 1996, retrieved from <http://www.action-research.com/discrete.html>, retrieved on Jan. 16, 2009 (8 pages).

Sinha et al., "Attribute Drivers: A Factor Analytic Choice Map Approach for Understanding Choices Among SKUs," Marketing Science, vol. 24, No. 3, Summer 2005 (10 pages).

United States Patent and Trademark Office, "Final Office Action," issued in connection with U.S. Appl. No. 12/368,028, dated Jan. 18, 2012, (32 pages).

United States Patent and Trademark Office, "Non-Final Office Action," issued in connection with U.S. Appl. No. 12/368,028, dated Jun. 8, 2011 (16 pages).

United States Patent and Trademark Office, "Final Office Action," issued in connection with U.S. Appl. No. 12/368,028, dated Apr. 16, 2014 (39 pages).

United States Patent and Trademark Office, "Final Office Action," issued in connection with U.S. Appl. No. 12/368,028, dated Aug. 14, 2013 (34 pages).

United States Patent and Trademark Office. "Final Office Action," issued in connection with U.S. Appl. No. 12/476,806, dated Aug. 16, 2012 (17 pages).

United States Patent and Trademark Office, "Final Office Action," issued in connection with U.S. Appl. No. 12/887,027, dated Apr. 11, 2013 (14 pages).

United States Patent and Trademark Office, "Final Office Action," issued in connection with U.S. Appl. No. 13/081,924, dated Jun. 5, 2014 (19 pages).

United States Patent and Trademark Office, "Final Office Action," issued in connection with U.S. Appl. No. 13/081,924, dated Sep. 12, 2013 (19 pages).

United States Patent and Trademark Office, "Non-Final Office Action," issued in connection wvith U.S. Appl. No. 12/476,806, dated May 1, 2014 (22 pages).

United States Patent and Trademark Office, "Non-Final Office Action," issued in connection with U.S. Appl. No. 12/368,028, dated Mar. 19, 2013 (33 pages).

United States Patent and Trademark Office, "Non-Final Office Action," issued in connection with U.S. Appl. No. 12/368,028, dated Nov. 26, 2013 (37 pages).

United States Patent and Trademark Office, "Non-Final Office Action," issued in connection with U.S. Appl. No. 12/476,806, dated Dec. 1, 2014 (21 pages).

United States Patent and Trademark Office, "Non-Final Office Action," issued in connection with U.S. Appl. No. 12/476,806, dated Oct. 7, 2011 (15 pages).

United States Patent and Trademark Office, "Non-Final Office Action," issued in connection with U.S. Appl. No. 12/887,027, dated Jan. 15, 2015 (16 pages).

United States Patent and Trademark Office, "Non-Final Office Action," issued in connection with U.S. Appl. No. 12/887,027, dated Apr. 27, 2012 (9 pages).

United States Patent and Trademark Office, "Non-Final Office Action," issued in connection with U.S. Appl. No. 13/081,924, dated Feb. 28, 2013 (15 pages).

United States Patent and Trademark Office, "Non-Final Office Action," issued in connection with U.S. Appl. No. 13/081,924, dated Jan. 15, 2014 (19 pages).

Wen et al., "The Generalized Nested Logit Model," Transportation Research Part B, 35, 2001 (15 pages).

Wikipedia, "Agent-Based Model," retrieved from <http://en.wikipedia.org/w/index.php?title=Agent-based_model&printiable=yes>, retrieved on Jan. 21, 2009 (7 pages).

Wikipedia, "Estimation Theory," retrieved from <http://en.wikipedia.org/w/index.php?title=Estimation_theory&printable=yes>, retrieved on Mar. 15, 2011 (8 pages).

Wikipedia, "Goodness of Fit," retrieved from <http://en.wikipedia.org/w/index.php?title=Goodness_of_fit&printable=yes>, retrieved on Mar. 15, 2011 (4 pages).

Wikipedia, "Independence of Irrelevant Alternatives," retrieved from <http://en.wikipedia.org/w/index.php?title=Independence_of_irrelaevant_alternatives&printable=yes>, retrieved on Feb. 15, 2011 (7 pages).

Wikipedia, "Multinomial Logit," retrieved from <http://en.wikipedia.org/w/index.php?title=Multinomial_logit&printable=yes>, retrieved on Feb. 15, 2011 (3 pages).

Wikipedia, "Revision History of Agent-Based Model," retrieved from <http://en.wikipedia.org/w/index.php?title=Agent-based model&dir=prev>, retrieved on Jan. 21, 2009 (1 page).

European Patent Office, "Communication Pursuant to Article 94(3) EPC," issued in connection with European Patent Application No. 13151891.2, dated Jun. 1, 2016 (6 pages).

United States Patent and Trademark Office, "Examiner's Answer to Appeal Brief", issued in connection with U.S. Appl. No. 12/368,028, dated Apr. 21, 2015 (11 pages).

United States Patent and Trademark Office, "Final Office Action," issued in connection with U.S. Appl. No. 12/476,806, dated Jun. 30, 2015 (21 pages).

International Searching Authority, "International Preliminary Report on Patentability," issued in connection with International Patent Application No. PCT/US2014/026808, dated Sep. 24, 2015 (7 pages).

International Searching Authority, "International Preliminary Report on Patentability," issued in connection with International Patent Application No. PCT/US2014/027812, dated Sep. 24, 2015 (7 pages).

Canadian Intellectual Property Office, "Examiner's Report," issued in connection with Canadian Patent Application No. 2,428,079, dated Oct. 26, 2015 (3 pages).

United States Patent and Trademark Office, "Final Office Action" issued in connection with U.S. Appl. No. 12/887.027, dated Oct. 8, 2015 (20 pages).

Canadian Intellectual Property Office, "Examiner's Report," issued in connection with Canadian Patent Application No. 2,566,943, dated Aug. 12, 2015 (6 pages).

United States Patent and Trademark Office, "Notice of Allowance," issued in connection with U.S. Appl. No. 13/283,495, dated Jun. 8, 2016 (7 pages).

United States Patent and Trademark Office, "Notice of Allowance," issued in connection with U.S. Appl. No. 13/740,699, dated Dec. 8, 2015 (17 pages).

United States Patent and Trademark Office, "Non-Final Office Action," issued in connection with U.S. Appl. No. 13/283,495, dated Nov. 23, 2015 (8 pages).

Geyer-Schulz, "On Learning in a Fuzzy Rule-Based Expert System," Supplement to Kybernetika, vol. 28, 1992, downloaded from www.kybernetika.cz/contcnt/1992/7/33/paper.pdf. Nov. 24, 2015 (4 pages).

United States Patent and Trademark Office, "Non-Final Office Action," issued in connection with U.S. Appl. No. 14/211,788 dated Apr. 27, 2016 (8 pages).

United States Patent and Trademark Office, "Final Office Action," issued in connection with U.S. Appl. No. 14/208,013 dated Feb. 14, 2017 (66 pages).

United States Patent and Trademark Office. "Final Office Action," issued in connection with U.S. Appl. No. 14/211,788 dated Oct. 4, 2016 (11 pages).

United States Patent and Trademark Office, "Notice of Allowance and Fee(s) Due", issued in connection with U.S. Appl. No. 14/208,013, dated Jun. 2, 2017, 7 pages.

(56) References Cited

OTHER PUBLICATIONS

Brintrup et al., "Ergonomic Chair Design by Fusing Qualitative and Quantitative Criteria Using Interactive Genetic Algorithms," IEEE Transactions on Evolutionary Computation, vol. 12, No. 3, Jun. 2008, 12 pages.

Hudson et al, "The Application of Genetic Algorithms to Conceptual Design," A1 System Support for Conceptual Design, Springer London, 1996, 20 pages.

Quiroz et al., "Towards Creative Design Using Collaborative Interactive Genetic Algorithms," 2009 IEEE Congress on Evolutionary Computation, Aug. 26, 2009, 8 pages.

Yang et al, "Development of a Product Configuration System with an Ontology-Based Approach," Computer-Aided Design, vol. 40, No. 8. Aug. 2008. 16 pages.

United States Patent and Trademark Office, "Non-Final Office Action" issued in connection with U.S. Appl. No. 14/208,013, dated Sep. 8, 2016. 14 pages.

United States Patent and Trademark Office, "Notice of Allowance and Fee(s) Due", issued in connection with U.S. Appl. No. 14/211,788, dated Jun. 21, 2017, 10 pages.

United States Patent and Trademark Office, "Patent Board Decision", issued in connection with U.S. Appl. No. 14/559,084, dated Jun. 21, 2017, 8 pages.

United States Patent and Trademark Office, "Examiner's Answer", issued in connection with U.S. Appl. No. 14/559,084, dated May 3, 2016, 5 pages.

United States Patent and Trademark Office, "Final Office action", issued in connection with U.S. Appl. No. 14/559,084, dated Jul. 17, 2015, 8 pages.

United States Patent and Trademark Office, "Non-Final Office action", issued in connection with U.S. Appl. No. 14/559,084, dated Mar. 11, 2015, 16 pages.

United States Patent and Trademark Office, "Decision on Appeal", issued in connection with U.S. Appl. No. 12/368,028, dated Aug. 11, 2017, 17 pages.

Terano et al., "Marketing Data Analysis Using Inductive Learning and Genetic Algorithms with Interactive- and Automated-Phases," Evolutionary Computation, 1995, IEEE International Conference on Perth, vol. , Nov. 29, 1995 (6 pages).

International Searching Authority, "International Search Report and Written Opinion," issued in connection with International Patent Application No. PCT/US2014/026808, dated Jun. 26, 2014 (8 pages).

European Patent Office, "Extended Search Report." issued in connection with European Patent Application No. 13151891.2, dated Sep. 27, 2013 (5 pages).

United States Patent and Trademark Office, "Non-final Office Action," issued in connection with U.S. Appl. No. 15/680,939, dated Jun. 22, 2018, 18 pages.

International Searching Authority, "International Search Report and Written Opinion," issued in comrection with International Patent Application No. PCT/US2014/027812, dated Jul. 24, 2014, 8 pages.

United States Patent and Trademark Office, "Notice of Allowance," mailed in connection with U.S. Appl. No. 15/728,100, dated Apr. 10, 2020, 7 pages.

United States Patent and Trademark Office, "Non-final Office Action," mailed in connection with U.S. Appl. No. 16/508,013, dated Nov. 18, 2019, 8 pages.

United States Patent and Trademark Office, "Notice of Allowance," mailed in connection with U.S. Appl. No. 15/680,939, dated Feb. 25, 2019, 16 pages.

United States Patent and Trademark Office, "Non-final Office Action," mailed in connection with U.S. Appl. No. 15/728,100, dated Jul. 25, 2019, 21 pages.

Fry et al., "Testing for Independence of Irrelevant Alternatives: Some Empirical Results," Sociological Methods & Research, vol. 26, Feb. 1998, 24 pages.

Dow et al., "Multinomial Probit and Multinomial Logit: A Comparison of Choice Models for Voting Research," Electoral Studies, vol 23, 2003, 16 pages.

United States Patent and Trademark Office, "Non-Final Office Action," issued in connection with U.S. Appl. No. 15/730,336, dated Jul. 30, 2019, 7 pages.

United States Patent and Trademark Office," Non-Final Office Action," issued in connection with U.S. Appl. No. 15/730,336, dated May 11, 2020, 4 pages.

United States Patent and Trademark Office, " Final Office Action," issued in connection with U.S. Appl. No. 15/730,336, dated Feb. 26, 2020, 8 pages.

United States Patent and Trademark Office, "Advisory Action," issued in connection with U.S. Appl. No. 15/730,336, dated May 11, 2020, 2 pages.

United States Patent and Trademark Office, "Notice of Allowance," issued in connection with U.S. Appl. No. 15/728,100, dated Apr. 10, 2020, 7 pages.

Intellectual Property India, "Hearing Notice," issued in connection with Indian Patent Application No. 625/KOLN/2012, dated Jul. 7, 2020, 2 pages.

United States Patent and Trademark Office, " Non-Final Office Action," issued in connection with U.S. Appl. No. 16/508,013, dated Nov. 18, 2019, 8 pages.

United States Patent and Trademark Office, "Final Office Action," issued in connection with U.S. Appl. No. 16/508,013, dated Apr. 8, 2020, 10 pages.

United States Patent and Trademark Office, "Non-final Office Action," issued in connection with U.S. Appl. No. 16/508,013, dated Aug. 27, 2020, 8 pages.

United States Patent and Trademark Office, " Non-Final Office Action," issued in connection with U.S. Appl. No. 17/156,220, dated May 20, 2022, 17 pages.

United States Patent and Trademark Office. "Non-Final Office Action," issued in connection with U.S. Appl. No. 17/345,950, dated Jul. 21, 2022, 6 pages.

Currim, "Predictive Testing of Consumer Choice Models Not Subject to Independence of Irrelevant Alternatives," Journal of Marketing Research, vol. XIX, pp. 208-222. May 1982, 16 pages.

United States Patent and Trademark Office, "Final Office Action", issued in connection with U.S. Appl. No. 17/156,220 dated Nov. 30, 2022, 21 pages.

Sankaran, "Empowering Consumer Research with Data Science," IEEE Xplore, downloaded on Nov. 23, 2022, 5 pages.

\* cited by examiner

| TID | PID | RETRIEVED CHARACTERISTIC VALUES | TRANSACTION SET |
|---|---|---|---|
| 100 | P2 | {C2, C47, C90} | {C2, C15, C32, C47, C55, C61, C80, C90} |
| | P6 | {C15, C32, C55, C80} | |
| | P7 | {C2, C61} | |
| 101 | P1 | {C4, C10, C88} | {C2, C4, C10, C43, C47, C52, C59, C88, C90, C100} |
| | P2 | {C2, C47, C90} | |
| | P4 | {C43, C52, C59} | |
| | P8 | {C100} | |
| $TID_N$ | $P_{N1}$ | $C(P_{N1})$ | $C(P_{N1}) \cup C(P_{N2}) \cup C(P_{N3})$ |
| | $P_{N2}$ | $C(P_{N2})$ | |
| | $P_{N3}$ | $C(P_{N3})$ | |

FIG. 5A

CONSUMER SEGMENT DATA SET — 550

| Segments — 552 | Attributes — 554 |
|---|---|
| Seg1 | G1, G2, G3, D1,D2, D3, B1, B2, B3, L1, L2, L3 ← 558 |
| Seg2 | G1, G2, G3, D3, D4, D5, B2, B4, B5, L5, L4, L3 |
| Seg3 | G4, G5, G3, D1, D2, D4, B1, B2, B5, L1, L2, L3 |
| Seg4 | G4, G5, G3, D3, D4, D5, B6, B7, B5, L4, L6 |
| Seg5 | G6, G7, G2, D1, D2, D6, B2, B3, B8, L1, L4, L3 |
| Seg6 | G6, G7, G2, D3, D4, D7, B4, B5, B6, L5, L7, L6 |
| Seg7 | G8, G9, G1, D1, D2, D5, B2, B4, B5, L1, L4, L3 |
| Segn | Gn, Gn1, Gn2, D1, D2, Dn, B3, B4, Bn, L1, L7, L3 |

METHODS AND APPARATUS TO IDENTIFY AFFINITY BETWEEN SEGMENT ATTRIBUTES AND PRODUCT CHARACTERISTICS

RELATED APPLICATION

This patent arises from a continuation of U.S. application Ser. No. 16/180,812, now U.S. Pat. No. 10,909,560, entitled "Methods and Apparatus to Identify Affinity Between Segment Attributes and Product Characteristics," which was filed on Nov. 5, 2018. U.S. application Ser. No. 16/180,812 claims priority to U.S. patent application Ser. No. 14/821,363, now U.S. Pat. No. 10,147,108, entitled "Methods and Apparatus to Identify Affinity Between Segment Attributes and Product Characteristics," which was filed on Aug. 7, 2015. U.S. patent application Ser. No. 14/821,363 claims the benefit under 35 U.S.C. § 119(e) of U.S. Provisional Patent Application Ser. No. 62/142,427, entitled "Methods and Apparatus to Identify Affinity Between Segment Attributes and Product Characteristics," which was filed on Apr. 2, 2015. U.S. application Ser. No. 16/180,812, U.S. patent application Ser. No. 14/821,363, and U.S. Provisional Patent Application Ser. No. 62/142,147 are hereby incorporated herein by reference in their entireties. Priority to U.S. application Ser. No. 16/180,812, U.S. patent application Ser. No. 14/821,363, and U.S. Provisional Patent Application Ser. No. 62/142,147 is hereby claimed.

FIELD OF THE DISCLOSURE

This disclosure relates generally to market research, and, more particularly, to methods and apparatus to identify affinity between segment attributes and product characteristics.

BACKGROUND

In recent years, retailers, marketers, and manufacturers have tried to predict which products can be marketed/displayed together to promote sales. These predictions are used, for example, to design promotions, print coupons at the point of sale, design retail floor plans, and/or design products to complement existing products. Market research entities often rely on (a) information generated by loyalty programs, (b) demographics, and/or (c) databases of past transactions to provide product recommendations to consumers, marketers, retailers and manufacturers.

BRIEF DESCRIPTION OF THE DRAWINGS

FIG. 5A illustrates example transaction sets generated from a transaction record.

FIG. 5B illustrates example attributes for corresponding segments.

DETAILED DESCRIPTION

Figure 1:
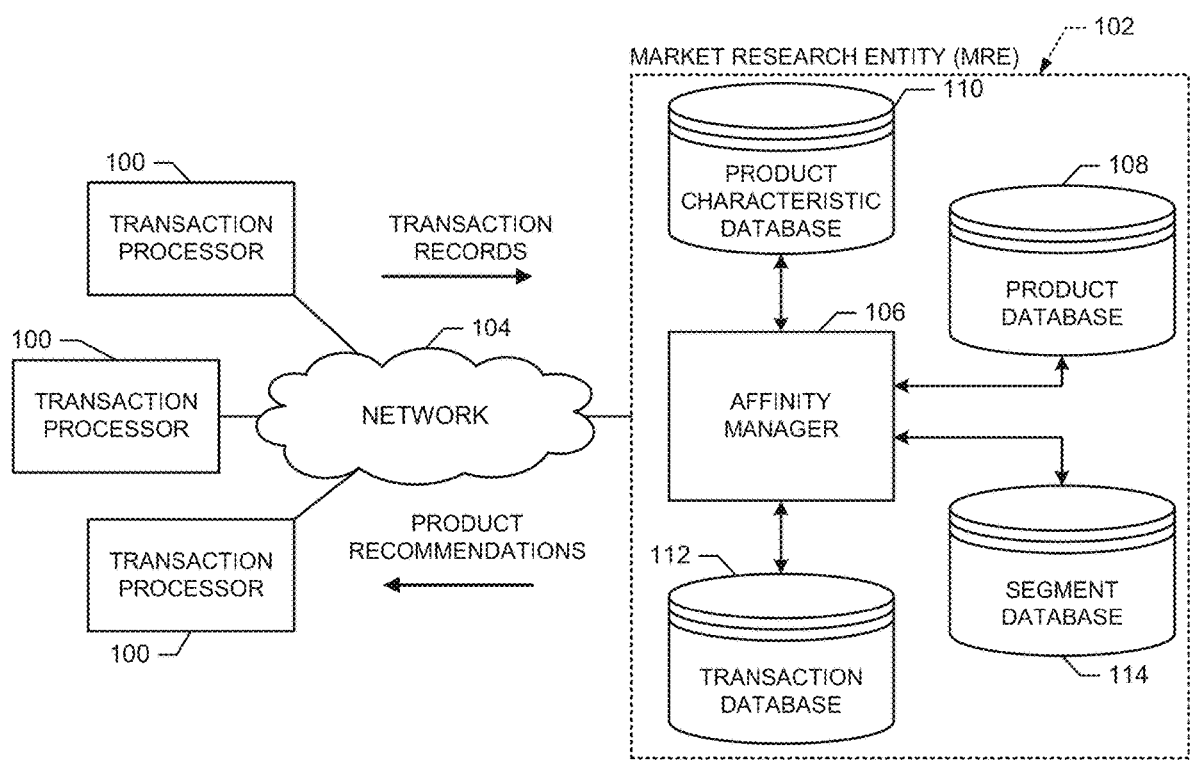
FIG. 1 illustrates an example system having one or more transaction processors in communication with a market research entity (MRE) to generate product recommendations.

Examples disclosed herein may be used to predict which consumer segments should be targeted for marketing of a product of interest. Additionally, examples disclosed herein may be used to identify candidate product characteristics to be added to a product that improve a likelihood of success in a segment of interest. Marketing for the product of interest may include coupons, cross-promotional offers, marketing suggestions and/or product development research. One or more predictions are generated based on affinity relationships associated with characteristic values of the product of interest and affinity relationships associated with attributes of one or more consumer segments. As used herein, "product affinity" of one or more products refers to one or more metrics that reflect and/or otherwise predict a likelihood of which products or characteristic (e.g., product characteristics, user characteristics, etc.) values go together in a transaction (e.g., a shopping basket, etc.) with an occurrence threshold and/or a level of confidence. As used herein, "segment affinity" of one or more consumer segments refers to one or more metrics that reflect and/or otherwise predict a likelihood of which segment attributes (e.g., age, gender, number of children in a household, etc.) go together in a transaction (e.g., a shopping basket, etc.) with an occurrence threshold and/or a level of confidence. As used herein, general reference(s) to "affinity" refers to either a product affinity, a segment affinity, and/or one or more metrics indicative of a likelihood that a particular product characteristic and a particular segment attribute occur together with a level of confidence.

A high affinity value has a corresponding high level of confidence that a particular product characteristic and a particular segment will occur together. A low affinity value has a corresponding low level of confidence that a particular product characteristic and a particular segment will occur together. An association is a relationship between a first group of one or more products/characteristic values/segment attributes and a second group of one or more products/characteristic values/segment attributes, where an appearance of the first group in a transaction implies that the second group may also appear in the transaction. An affinity rule is an association that has a greater than a threshold level of support of observed occurrences and a greater than a threshold level of confidence of such occurrences, as described in further detail below.

A market research entity (MRE) may establish a threshold (e.g., minimum) level of support and a corresponding threshold (e.g., minimum) level of confidence to discard insignificant associations and/or to discard one or more associations that occur infrequently. An example MRE may establish a threshold level of confidence of, for example, 5%. Further, an example product association may state that a "package of cookies implies milk" and may be denoted with an arrow symbol, such as ("a package of cookies"→"milk"). The example association may have a confidence level of 27%. An example affinity rule may state that, with a 27% level of confidence, a package of cookies implies milk (i.e., 27% of the transactions that contain a package of cookies also contain milk). In other examples, a specific product of interest may be analyzed to identify which characteristics exhibit a relatively highest affinity with other characteristics. A yogurt product, for example, exhibits relatively strong affinity between its characteristics of low calories, high protein, and low carbohydrates.

In still other examples, the MRE identifies consumer groups (e.g., segments) associated with respective consumers that are based on geographical, demographic, behavioral and/or lifestyle attributes. An example segment association may state that "healthful food consumers implies regular exercise routines." Stated differently, segment attributes of the example healthful food consumers having the strongest relative affinity include people who follow regular exercise routines, maintain regular physician appointments, eat healthy foods, and pay attention to nutrition.

Examples disclosed herein identify, in some instances, potential affinity between the healthful food consumer attributes and the yogurt product characteristics. That affinity may be used to predict which segments will likely buy a product/service of interest. Without information that indicates whether a product of interest is likely to be adopted by (e.g., purchase) a particular segment of interest, then marketing efforts toward that segment of interest may be wasteful. Additionally, one or more other products of interest may be analyzed to identify corresponding product affinity values to determine respective segment affinity values. As such, those segments that represent the segment affinity values may be identified and/or predicted as one or more target segment groups to which the candidate product of interest will likely succeed with marketing efforts. As such, examples disclosed herein reduce (e.g., minimize) money and/or resources when marketing the product(s) of interest, thereby improving a market success of the product(s) of interest by targeting those particular segments having a higher likelihood of purchasing.

The MRE may maintain a database of products that associates trade item numbers (e.g., Universal Product Codes (UPC), International Article Numbers (EAN), Japanese Article Numbers (JAN), International Standard Book Numbers (ISBN), Manufacturer Part Numbers (MPN), etc.) with product identifiers (IDs) and/or other product information (e.g., short description, long description, brand, manufacturer, trade item number history, etc.). The product ID may be a unique identifier separate from the trade item number and may be assigned to a product by the MRE. The product IDs may identify products that are part of a transaction or a series of related transactions. Additionally, the MRE may maintain a database of characteristic values to associate product IDs with characteristic values. Characteristic values are a discrete set of uniform descriptors defined by the MRE to categorize products in the products database. Characteristic values include a greater degree of descriptive granularity compared to product information (e.g., short description, long description, etc.) associated with a product in the product database. In some examples, the characteristic values include brand, product type and color, packaging and packaging materials, and marketing claims (e.g. organic, low calorie, etc.), etc. In some examples, a product ID may be associated with a large number of characteristic values. In some examples, the database of products and the database of characteristic values may be linked.

Generating product affinity rules using characteristic values allows for generation of targeted product recommendations. Continuing the example discussed above, a package of cookies might be associated with the characteristic values of "high fiber" and "gluten free." An example affinity rule might state that "high fiber" and "gluten free" characteristic values are related to "skim" with an 80% confidence level. Stated differently, 80% of transactions that include both "high fiber" and "gluten free" characteristic values will also include a "skim" characteristic value. Thus, when a package of high fiber, gluten free cookies appears in a customer's basket, a product recommendation (e.g., a coupon, an advertisement, an instant discount, etc.) to buy skim milk may be generated instead of a generic product recommendation to buy milk.

In some examples, when a commercial establishment (e.g., a retailer, a supermarket, a warehouse store, a sports equipment store, etc.) wants to decide which products to stock, example methods and/or apparatus disclosed herein provide strategic information for a product recommendation (e.g., a marketing plan, a layout plan, etc.) by recommending item combinations to stock and/or new products to supplement sales of existing products. For example, a commercial establishment that wants to expand its health food sales may receive a product recommendation to stock both high fiber, gluten free cookies and skim milk. In some examples, a manufacturer that wants to engineer a new product and/or supplement an existing product line may receive a product recommendation (e.g. analysis report, etc.) to create a skim milk latte to supplement strong sales of high fiber, gluten free cookies.

Generating segment affinity rules using segment attribute values allows for identification of segment attributes that are likely to occur together in a purchase decision. The consumer segment of healthful food consumers exhibits relatively strongly associated attributes of regular check-ups, healthy eating, exercise and reading nutrition labels. As such, an example segment affinity rule/association might state that the presence of the healthy eating attribute in a group (e.g., a segment group of interest) suggests a co-presence of the exercise attribute, in which these two example attributes have a 70% likelihood of occurring together. In other examples, the presence of an age attribute of 28-32 and a marriage attribute suggests a co-presence of an attribute of the presence of children in the household. Knowledge of the segment affinities for a particular group facilitates an ability to consider other group attributes that are likely to occur when targeting, for example, marketing efforts (e.g., marketing efforts of a particular product having particular characteristics that have a degree of affinity with one or more segment attributes).

In some examples, a customer may bring products to a transaction processor (e.g., a register, an online shopping cart, a household-based scanner, etc.). At the transaction processor, trade item numbers (e.g., Universal Product Codes (UPC), International Article Numbers (EAN), Japanese Article Numbers (JAN), International Standard Book Numbers (ISBN), Manufacturer Part Numbers (MPN), etc.) associated with the products are scanned (e.g., at a register) and/or retrieved from metadata associated with a product (e.g., at an ecommerce transaction). These products may be grouped to form a new transaction record associated with a transaction identifier (ID). A transaction ID is a value that identifies the transaction record and/or trade item numbers that belong to the transaction record. The new transaction record contains the trade item numbers processed in a transaction (e.g., the trade item numbers associated with the products in a customer's shopping basket at checkout, etc.). In some examples, one or more trade item numbers are sent to the MRE before a transaction is completed (e.g., as the trade item numbers are scanned and/or collected by the transaction processor, etc.). In other examples, the trade item numbers are sent to the MRE as the transaction record when the transaction is complete. As described in further detail below, when the transaction is complete, a new set of affinity rules may be generated using the new transaction and one or more existing transactions from a transaction database. A product recommendation may then be generated. In some examples, the MRE may send the product recommendation to a retailer associated with the transaction. The retailer, in some examples, presents (e.g., via a coupon, via an advertisement, via an instant discount, via a personalized shopping portal, etc.) the product recommendation to the customer associated with the transaction.

In other examples, the MRE seeks insight regarding correlations between (a) certain product characteristics and/or characteristic values of a product of interest and (b) consumer segments and/or attributes associated with one or more consumer segments. In the event correlations (e.g., affinities) are identified between one or more product characteristics and one or more segment attributes, then predictions may be made for the product of interest regarding which target segments will likely result in successful marketing efforts and/or a prediction of which target segments are likely to buy one or more products/services of interest.

FIG. 1 illustrates example transaction processors 100 (e.g., cash registers, online shopping carts, credit card processors, household-based scanners, etc.) which provide transaction records to an example market research entity (MRE) 102. In some examples, the MRE 102 provides product recommendations (e.g., advertisements, coupons, instant discounts, marketing plans, layout plans, analysis reports, etc.) to the transaction processor 100, such as during point-of-sale activities to offer real-time marketing opportunities. In the illustrated example, the example transaction processors 100 communicate with the MRE 102 through a network 104 via a wired and/or wireless connection (e.g., a cable/DSL/satellite modem, a cell tower, etc.).

The MRE of the illustrated example of FIG. 1 includes an example affinity manager 106, an example product database 108, an example product characteristic database 110, an example transaction database 112, and an example segment database 114. In the illustrated example of FIG. 1, the MRE 102 is provided with the product database 108 to store product identifiers (IDs) to be used in generating product affinity rules. In some examples, the affinity manager 106 retrieves product IDs from the product database 108 for the products in a new transaction basket. In some examples, the MRE 102 maintains the product database 108 by adding, removing, and/or updating information associated with a product ID (e.g., adding new products, removing obsolete product information, updating product identifiers, etc.).

In the illustrated example of FIG. 1, the MRE 102 is provided with the product characteristics database 110 to store characteristic values to use when generating characteristic value-based product affinity rules. In some examples, the product database 108 and the product characteristic database 110 are linked so that retrieving a product ID from the product database 108 also retrieves the characteristic values from the product characteristic database 110 that are associated with the product ID. In some examples, the affinity manager 106 uses the product ID to retrieve characteristic values associated with the product from the product characteristic database 110. In some examples, the MRE 102 maintains the product characteristic database 110 by adding, removing, and/or updating characteristic values that are associated with product IDs in the product database 108 (e.g., the MRE 102 associates new characteristic values to a product, removes characteristic values associated with a product, etc.). As described above, characteristic values may include brand, product type, color, packaging and packaging materials, and/or marketing claims (e.g. organic, low calorie, etc.), etc. In some examples, the characteristics values are a discrete set of uniform descriptors (e.g., "organic," "power-saving," "packaging: silver," "packaging: red," etc.) defined by the MRE 102.

The example MRE 102 of FIG. 1 is provided with the transaction database 112 to store transaction baskets used in generating affinity rules. In some examples, when a new transaction record is received from one of the transaction processors 100, the affinity manager 106 generates a new transaction set (e.g., a set containing characteristic values associated with products in the new transaction record) and stores the new transaction set in the transaction database 112. In some examples, the MRE 102 adds and/or removes transaction sets from the transaction database 112 independent of the affinity manager 106 to manage the transaction sets used to generate product affinity rules (e.g., adds transactions sets from other sources, removes out-of-date transaction sets, etc.).

Figure 2:
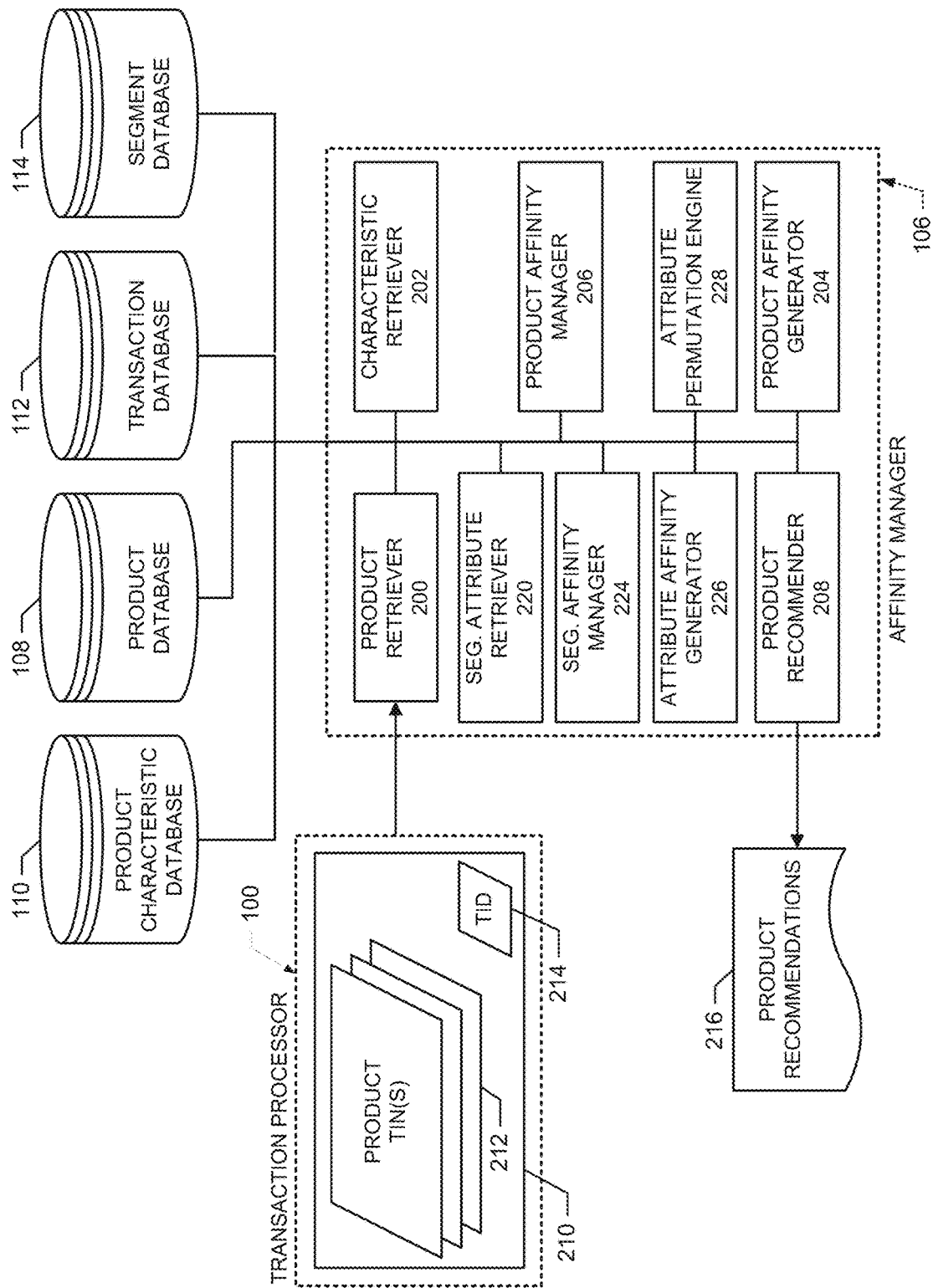
FIG. 2 illustrates the example affinity manager of FIG. 1 to receive transaction records and generate product recommendations.

FIG. 2 illustrates an example implementation of the affinity manager 106 of FIG. 1. In the illustrated example of FIG. 2, the affinity manager 106 includes a product retriever 200, a characteristics retriever 202, a product affinity generator 204, a product affinity manager 206, a product recommender 208, a segment attribute retriever 220, a segment affinity manager 224, an attribute affinity generator 226 and an attribute permutation engine 228. The example product retriever 200 receives an example transaction record 210 from a transaction processor (e.g., one of the example transaction processors 100 of FIG. 1) which contains trade item numbers 212 (e.g. Universal Product Codes (UPC), International Article Numbers (EAN), Japanese Article Numbers (JAN), International Standard Book Numbers (ISBN), Manufacturer Part Numbers (MPN), etc.) associated with an example transaction identifier (ID) 214. In some examples, the product retriever 200 receives the trade item numbers 212 associated with the transaction ID 214 from the transaction processor 100 as the trade item numbers 212 are processed by the transaction processor 100 (e.g., as the trade item numbers 212 are being scanned by a point-to-sale device at the transaction processor(s) 100, etc.). In some examples, the transaction processor 100 sends a set of trade item numbers 212 associated with the transaction ID 214 when a transaction is complete (e.g., after a customer checks out/proceeds to check out using an ecommerce retailer, etc.).

In the illustrated example of FIG. 2, upon receiving the trade item numbers 212, the product retriever 200 retrieves product IDs from the product database 108 associated with the received trade item numbers 212. The product IDs may be any value(s) (e.g., alphanumeric value(s), alphanumeric plus symbol value(s), etc.) that uniquely identifies a product in the product database 108. In some examples, the product ID is an alphanumeric value assigned to the product by the MRE 102 (FIG. 1).

Figure 3:
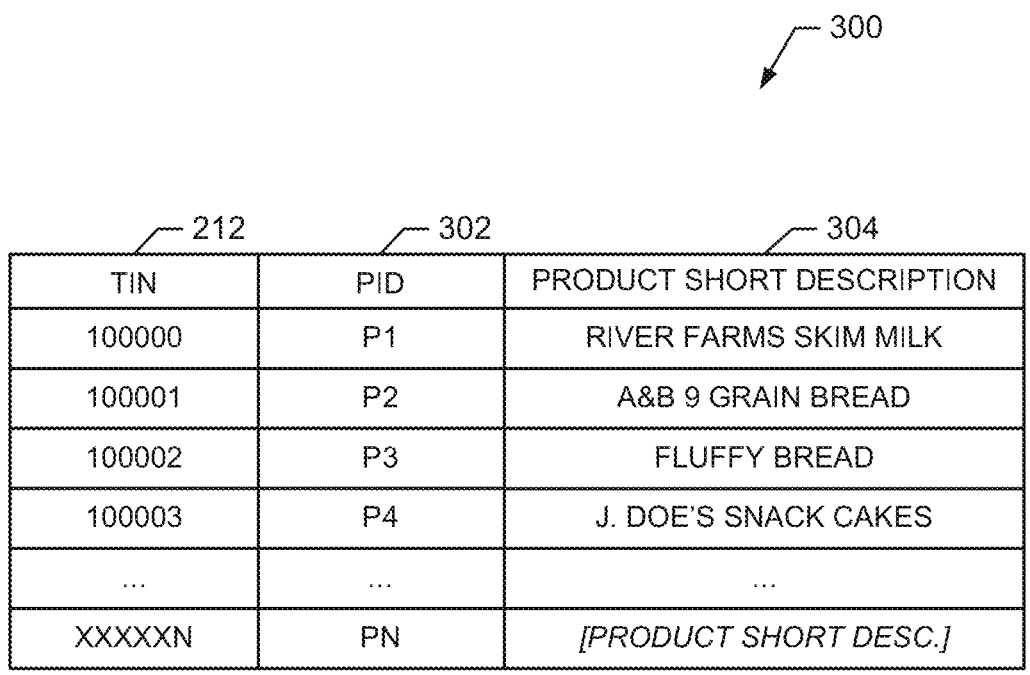
FIG. 3 illustrates an example data structure to associate trade item numbers with product identifiers.

FIG. 3 depicts an example data structure 300 that may be retrieved and/or otherwise received by the example product retriever 200 (FIG. 2) from the example product database 108. In the illustrated example of FIG. 3, the data structure 300 includes trade item numbers (TIN) (e.g., the trade item numbers 212 of FIG. 2) associated with a product ID (PID) 302 and a product short description 304 (e.g., a description of the product that contains key specifications/features, brand, and/or product name, etc.). A trade item number 212 is a value (e.g., numeric value, alphanumeric value, etc.) associated with a product that uniquely identifies the product. Example implementations of trade item numbers 212 include Universal Product Codes (UPC), International Article Numbers (EAN), Japanese Article Numbers (JAN), International Standard Book Numbers (ISBN), Manufacturer Part Numbers (MPN), etc. In some examples, the trade item number(s) 212 may be associated with other product information (e.g., brand, packaging, trade item number history, long description, etc.) in the product database 108.

In the example illustrated in FIG. 2, the characteristic retriever 202 receives and/or otherwise retrieves the product IDs (e.g., the product IDs 302 of FIG. 3) associated with transaction IDs 214 from the product retriever 200. The example characteristic retriever 202 retrieves characteristic values associated with the example product IDs 302 from the product characteristic database 110.

Figure 4:
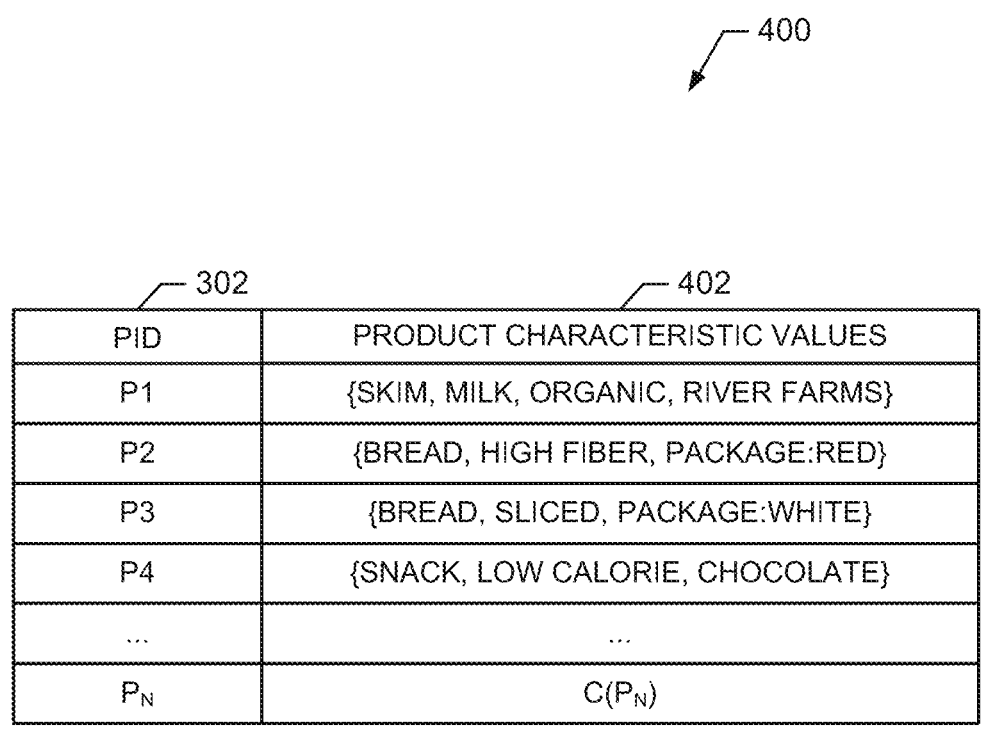
FIG. 4 illustrates an example data structure to associate product identifiers with characteristics values.

FIG. 4 depicts an example data structure 400 that may be retrieved by the example characteristic retriever 202 from the example product characteristic database 110. In the illustrated example of FIG. 4, product IDs 302 (FIG. 3) are associated with one or more corresponding sets of characteristic values 402. In the illustrated example of FIG. 2, the characteristic retriever 200 creates a transaction set associated with the transaction IDs 214 containing the retrieved sets of characteristic values 402. FIG. 5A includes a table 500 that depicts example transaction sets 500 created by the example characteristic retriever 202 of FIG. 2 by combining example retrieved characteristic values 502, as described in further detail below.

Returning to the illustrated example of FIG. 2, the product affinity manager 206 maintains and/or generates a map and/or table of characteristic values. In some examples, the example product affinity manager 206 maintains a count on the map and/or table for each of the characteristic values defined by the MRE 102. In some examples, the product affinity manager 206 maintains the map and/or table characteristic values in a hash table in memory (e.g. main memory 1514, 1516, and/or mass storage device 1528 of FIG. 15, as described further below). In some examples, the product affinity manager 206 iterates through and/or otherwise parses the transaction database 112 and counts the occurrences of characteristic values in one or more transaction sets (e.g., transaction sets 504 of FIG. 5A) in the transaction database 112. In the illustrated example of FIG. 2, the product affinity manager 206 receives and/or otherwise retrieves the new transaction set from the characteristic retriever 202 and increments the count on the map and/or table of characteristic values corresponding to the characteristic values in the received new transaction set. In some examples, the example product affinity manager 206 adds the new transaction set to the transaction database 112 to be used by the example product affinity generator 204 as described below.

In the example illustrated in FIG. 2, the product affinity generator 204 retrieves transaction sets (e.g., transaction sets 500 of FIG. 5A) from the transaction database 112. In some examples, the example product affinity generator 204 also receives and/or otherwise retrieves the map and/or table of characteristic value counts from the product affinity manager 206. In the illustrated example of FIG. 2, the product affinity generator 204 generates item sets from the transaction sets 500. As used herein, an item set is a permutation selected and/or otherwise generated from the transaction sets 500. For example, a transaction set that includes three characteristic values (C2, C15 and C32) would reflect at least six (6) item sets, one for each permutation. Stated differently, the six (6) item sets would be (C2→C15), (C2→C32), (C15→C32), (C15→C2), (C32→C2) and (C32→C15). As disclosed above, the arrow symbol "→" reflects an implication or occurrence between characteristics. For instance, (C2→C15) represents characteristic C2 "implies" or "implies the occurrence of" characteristic C15. In other examples, the permutations of transaction sets may include two or more characteristic values. Continuing with the example three characteristic values C2, C15 and C32, item sets may include (C2→C15 and C32), (C15→C2 and C32), (C32→C2 and C15), (C2 and C15→C32), (C2 and C32→C15), etc.

While a number of permutations for a given transaction set may be large, examples disclosed herein identify particular item sets (permutations) that exhibit a threshold number of occurrences. As disclosed above, product affinity refers to a metric that reflects a likelihood of which characteristic values occur together in a transaction with an occurrence threshold and/or a level of confidence. As such, the example product affinity generator 204 then generates frequent item sets from the item sets. As used herein, frequent item sets are item sets that have a threshold (e.g., minimum) level of support. In the illustrated example, support for an item set (e.g. item set X) is defined in a manner consistent with example Equation (1).

$$Sup(X) = \frac{\text{No. of Transaction Sets containing } X}{\text{Total No. of Transaction Sets}} * 100\% \qquad \text{Equation (1)}$$

In some examples, the threshold level of support is a minimum threshold percentage value defined by the MRE 102.

In some examples, the product affinity generator 204 generates the frequent item sets by using a frequent item set analysis. The frequent item set analysis may include, for example, a frequent-pattern growth algorithm, an apriori algorithm, a CLOSET algorithm, a CHARM algorithm, an Opus algorithm, and/or any other frequent item set analysis technique. In a frequent-pattern growth algorithm, for example, the product affinity generator 204 of the illustrated example constructs a frequent-pattern tree and iterates through conditional trees to generate the item sets from the transaction sets. In such examples, the product affinity generator 204 separates item sets that have a threshold (e.g., minimum) level of support (e.g., frequent item sets) and discards the item sets that do not have the threshold (e.g., minimum) level of support. In some examples, before generating frequent item sets, the example product affinity generator 204 removes characteristic values from the transaction sets 504 for characteristic values with counts on the map and/or table of characteristic value counts that do not exceed a frequency support threshold defined by the MRE 102.

In the example illustrated in FIG. 2, the product affinity generator 204 creates one or more associations from frequent item sets. To generate associations of the frequent item set, the example product affinity generator 204 of FIG. 2 generates nonempty subsets of the frequent item set and creates an association in a manner consistent with example Equation (2).

$$(S \rightarrow (F-S)), \quad \text{Equation (2)}$$

where S is a nonempty subset of frequent item set F, S is the left hand side (LHS) of the association, and (F−S) is the right hand side (RHS) of the association. For example, a frequent item set {A, B, C} may have the associations of (A,B→C), (B,C→A), (A,C→B), (C→A,B), (B→A,C), and (A→B,C). The example product affinity generator 204 of FIG. 2 calculates a level of confidence for each created association. The level of confidence is defined in a manner consistent with example Equation (3).

$$Conf(LHS \rightarrow RHS) = \frac{Sup(LHS \cup RHS)}{Sup(LHS)} * 100\% \quad \text{Equation (3)}$$

Product affinity rules are associations generated from frequent item sets that have a level of confidence above and/or otherwise satisfy a threshold (e.g., minimum) level of confidence as defined by the MRE 102.

As a quantity of additional transaction sets is evaluated, one or more product affinity rules is added to and/or updated with the example product recommender 208. As such, in response to receiving and/or otherwise retrieving a new transaction set (e.g., a transaction set 504 associated with a transaction identifier 214 representing one or more products purchased by a consumer during a shopping trip), the example product recommender 208 identifies one or more previously developed/calculated product affinity rules to identify one or more additional products having a likelihood of purchase.

In the example illustrated in FIG. 2, the product recommender 208 receives and/or otherwise retrieves the affinity rule(s) generated by the product affinity generator 204. The example product recommender 208 of FIG. 2 also receives and/or otherwise retrieves the new transaction set created by the example characteristic retriever 202 as described above. The example product recommender 208 selects one or more affinity rules that contain characteristic values in the example received new transaction set. The example product recommender 208 of the illustrated example retrieves at least one product ID from the example product characteristic database 110 corresponding to a product with characteristic values that satisfies at least one of the selected affinity rules (e.g., contains characteristic values from the RHS of the affinity rule). In the illustrated example of FIG. 2, the product recommender 208 generates one or more product recommendations 216 (e.g., coupons, advertisement prompts, cross-promotional offers, marketing suggestions, product development research, etc.). In some examples, the product recommender 208 sends the product recommendation 216 to the transaction processor 100 and/or a commercial entity (e.g., a retailer, a marketer, a manufacturer, etc.) associated with the transaction processor 100.

In still other examples, the product recommender 208 generates a ranked list of products having a greatest relative likelihood of being purchased in the respective transaction. The ranked list of products may be arranged based on respective level of confidence values (e.g., scores), such that products having the highest relative confidence value score are placed first, while relatively lower confidence value scores for other products have respectively lower rankings.

In some examples, a market researcher may wish to identify one or more appropriate target markets for the example products. For example, the products deemed to have the strongest product affinity with each other may also have a corresponding greater or lesser likelihood of purchase depending on particular attributes of a consumer segment. Example methods, apparatus, systems and/or articles of manufacture disclosed herein identify relationships between product characteristics and segment attributes. In operation, examples disclosed herein facilitate predictive analytics to determine which consumer segments are likely to purchase particular products of interest. Additionally or alternatively, examples disclosed herein may facilitate simulations of new products to identify which consumer/market segments will offer the greatest marketing opportunity. Additionally, in the event a product manufacturer has a product that sells in a first segment, but not in a second segment, examples disclosed herein may identify which one or more product characteristics, if added to the product, will enable the product manufacturer to sell the product in the second segment. In other words, examples disclosed herein allow a product manufacturer to develop a new product that can penetrate new segments of interest.

As discussed above, while some correlations occur between certain product characteristics to reveal associated product marketing opportunities, additional marketing opportunity insight may be developed, calculated and/or otherwise revealed in connection with segment attributes related to consumers that purchase those products. For example, relevant characteristics of a candidate yogurt product that exhibit relatively high product affinity scores are low calories, high protein and low carbohydrates. On the other hand, purchasers of the yogurt product of interest exhibit segment characteristics of regular exercise, regular doctor appointments, healthy eating, and nutrition awareness. Accordingly, by identifying a link between product characteristics and corresponding segment attributes having an affinity therebetween, product marketing decisions may be designed in a manner that improves marketing success and/or otherwise allows predictions of which segments are likely to purchase products/services of interest.

All consumers are divided into groups and/or marketing segments based on geographical, demographical, behavioral, lifestyle, etc., attributes. A particular segment (e.g., Seg1) may have any number and type of attribute, such as one or more geographical attributes ($G_1, G_2, \ldots, G_n$), one or more demographic attributes ($D_1, D_2, \ldots, D_n$), one or more lifestyle attributes ($L_1, L_2, \ldots, L_n$) one or more behavioral attributes ($B_1, B_2, \ldots, B_n$), etc.

In the illustrated example of FIG. 5B, a consumer segment table 550 includes a segment column 552 and an attributes column 554 to identify which attributes are associated with the segment in the corresponding segment column 552. Information related to segments in the example segment column 552 and attributes in the example attributes column 554 is stored in the example segment database 114, which derives such segment related information from panelists. In some examples, segment category information and/or corresponding segment attributes of the panelists are stored in the example segment database 114 after each product purchase. In still other examples, the panelist purchaser is referenced against a segmentation system to reveal a particular segment type and corresponding attributes associated with that particular segment type.

In operation, after product characteristics are identified (e.g., pairs of product characteristics, groups of two or more product characteristics, etc.) that satisfy (a) a threshold level of support (e.g., via satisfaction in a manner consistent with example Equation 1) and (b) a threshold level of confidence (e.g., via satisfaction in a manner consistent with example Equation 3), the example attribute retriever 220 identifies segments associated with the purchased products from which the product characteristics were derived. As discussed above, evaluation of the product characteristics was based on products purchased in the example transaction sets 504 of the illustrated example of FIG. 5B. The retrieved segments associated with corresponding products associated with the product identifiers (see the product identifier column 302 of FIG. 5A) are parsed by the example attribute retriever 220 to identify corresponding segment attributes that define each segment associated with the panelist that purchased products from the transaction set(s). For example, the attribute retriever 220 may identify "Seg1" 556 from the illustrated example table 550 of FIG. 5B and determine and/or otherwise retrieve corresponding segment attributes 558 associated therewith. In some examples, the segment attributes 558 may be defined by a segmentation system, such as the PRIZM® segmentation system by The Nielsen Company®.

The example segment affinity manager 224 generates segment affinity rules based on corresponding segment attributes occurring together in a manner that satisfies a threshold level of support and a threshold level of confidence. In particular, identified segment attributes from identified segments of interest are counted to determine whether they occur a threshold number of times and, if not, such segment attributes are removed from further consideration when searching for segment attribute combinations that may have a degree of affinity therebetween. Remaining attributes are assembled in item sets to form possible permutations/combinations. For example, if segment attributes G1, G2, and L2 are determined to occur a threshold number of times, then possible permutations of these segment attributes are (G1→G2 and L2), (G2→G1 and L2), (L2→G1 and G2), (G1 and G2→L2), (G1 and L2→G2) and (G2 and L2→G1). As described above in connection with product characteristic item sets generated from the transaction sets, a frequent-pattern tree, a frequent-pattern growth algorithm, an apriori algorithm, a CLOSET algorithm, a CHARM algorithm, an Opus algorithm and/or any other item set analysis technique may be applied to generate potential alternate attribute combinations/permutations. The attribute affinity generator 226 then applies resulting combinations/permutations to test for satisfaction of (a) a level of support and (b) a level of confidence.

Those attribute combinations/permutations that satisfy particular threshold levels of support and confidence are deemed to relate to the previously identified product characteristics that also satisfied the threshold level of support and confidence. Stated differently, the attribute combinations are deemed to have an affinity to the product characteristics, thereby indicating a likelihood of success for products having those particular characteristics selling within segments having those particular attributes. Accordingly, the retained attribute combinations/permutations serve as target attribute indictors when identifying one or more segments to be targeted for marketing of the products of interest having the previously identified characteristic product affinities. In other words, such retained attribute combinations/permutations facilitate predicting which segments may be targeted with products/services of interest. In still other examples, once affinities have been identified between particular product characteristics and corresponding segment attributes, thereby resulting in an "affinity set," examples disclosed herein determine new products having additional and/or otherwise alternate product characteristics that, if added/modified to an existing product, will exhibit success in a segment of interest in which the product manufacturer is not yet participating. As such, examples disclosed herein enable new augmented products to be introduced into a segment of interest with reduced risk of failure, and reduces waste (e.g., financial waste, organizational resource waste, etc.) by retooling a product for introduction into the segment of interest that may result from trial-and-error, management discretionary judgement, and/or focus groups that do not properly reflect the tastes and desires of the target segment of interest.

While an example manner of implementing the affinity manager 106 of FIG. 1 is illustrated in FIG. 2, one or more of the elements, processes and/or devices illustrated in FIG. 2 may be combined, divided, re-arranged, omitted, eliminated and/or implemented in any other way. Further, the example product retriever 200, the example characteristics retriever 202, the example product affinity generator 204, the example product affinity manager 206, the example product recommender 208, the example segment attribute retriever 220, the example segment affinity manager 224, the example attribute affinity generator 226, the example attribute permutation engine 228 and/or, more generally, the example affinity manager 106 of FIG. 1 may be implemented by hardware, software, firmware and/or any combination of hardware, software and/or firmware. Thus, for example, any of the example product retriever 200, the example characteristics retriever 202, the example product affinity generator 204, the example product affinity manager 206, the example product recommender 208, the example segment attribute retriever 220, the example segment affinity manager 224, the example attribute affinity generator 226, the example attribute permutation engine 228 and/or, more generally, the example affinity manager 106 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, product retriever 200, the example characteristics retriever 202, the example product affinity generator 204, the example product affinity manager 206, the example product recommender 208, the example segment attribute retriever 220, the example segment affinity manager 224, the example attribute affinity generator 226, and/or the example attribute permutation engine 228 is/are hereby expressly defined to include a tangible computer readable storage device or storage disk such as a memory, a digital versatile disk (DVD), a compact disk (CD), a Blu-ray disk, etc. storing the software and/or firmware. Further still, the example affinity manager 106 of FIG. 1 may include one or more elements, processes and/or devices in addition to, or instead of, those illustrated in FIG. 2, and/or may include more than one of any or all of the illustrated elements, processes and devices.

Flowcharts representative of example machine readable instructions for implementing the affinity manager 106 of FIGS. 1 and 2 are shown in FIGS. 6-14. In these examples, the machine readable instructions comprise one or more programs for execution by one or more processors, such as the processor 1512 shown in the example processor platform 1500 discussed below in connection with FIG. 15.

The program(s) may be embodied in software stored on a tangible computer readable storage medium such as a CD-ROM, a floppy disk, a hard drive, a digital versatile disk (DVD), a Blu-ray disk, or a memory associated with the processor 1512, but the entire program(s) and/or parts thereof could alternatively be executed by a device other than the processor 1412 and/or embodied in firmware or dedicated hardware. Further, although the example program(s) is described with reference to the flowcharts illustrated in FIGS. 6-14, many other methods of implementing the example affinity manager 106 may alternatively be used. For example, the order of execution of the blocks may be changed, and/or some of the blocks described may be changed, eliminated, or combined.

As mentioned above, the example processes of FIGS. 6-14 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably.

Additionally or alternatively, the example processes of FIGS. 6-14 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

As used herein, when the phrase "at least" is used as the transition term in a preamble of a claim, it is open-ended in the same manner as the term "comprising" is open ended.

Figure 6:
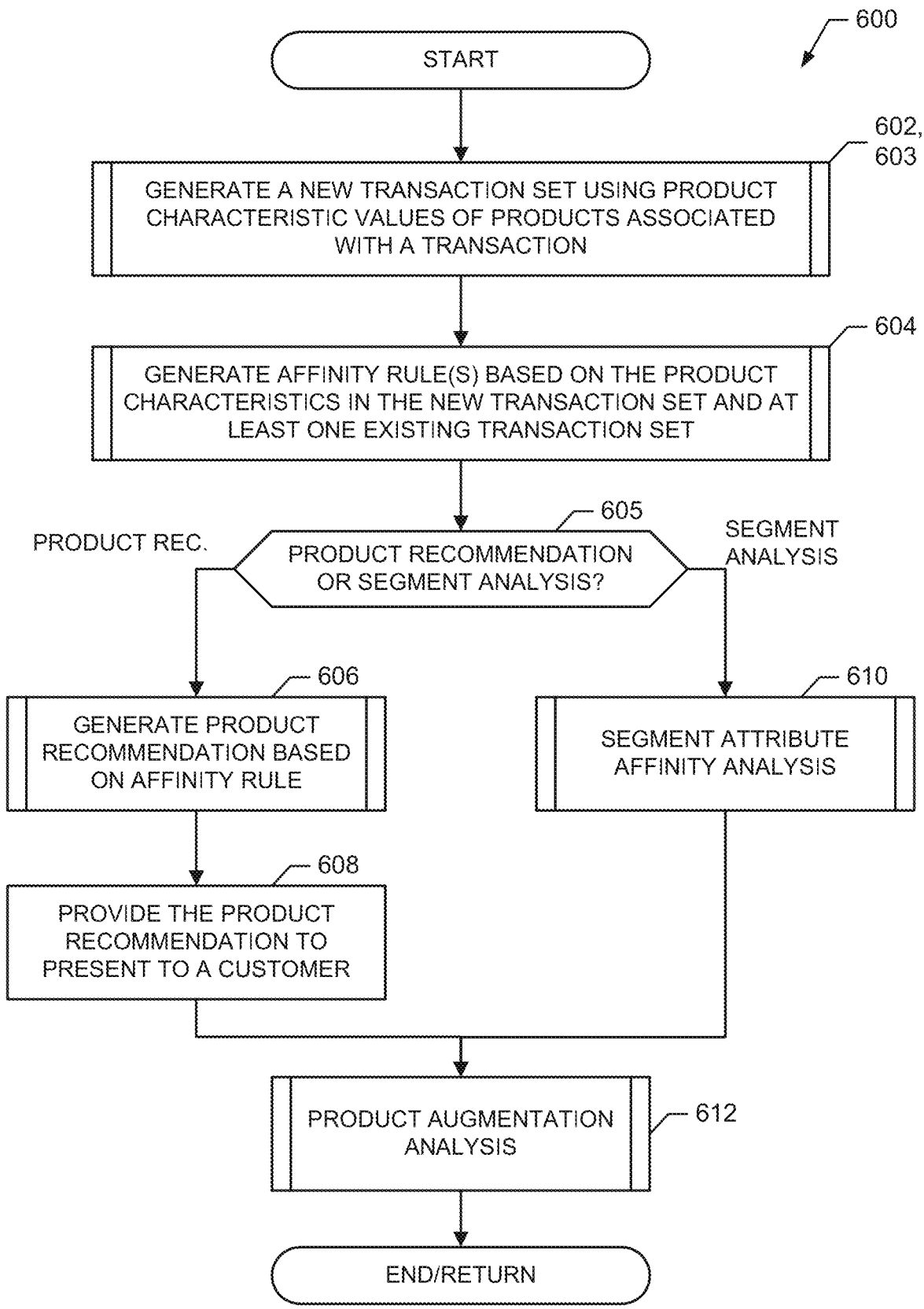
FIG. 6 is a flow diagram representative of example machine readable instructions that may be executed to implement an example affinity manager of FIG. 2 to generate product recommendations.

The example program 600 of FIG. 6 is executed to implement the example affinity manager 106 of FIGS. 1 and 2 to generate one or more product recommendations (e.g., the product recommendation 216 of FIG. 2) and/or to identify one or more segment attributes having a degree of affinity with one or more product characteristics. Initially, at block 602, the product retriever 200 (FIG. 2), the characteristic retriever 202 (FIG. 2) and/or the product affinity manager 206 (FIG. 2) receive and/or otherwise retrieve trade item numbers (e.g., the trade item numbers 212) from a transaction processor (e.g., the one of the transaction processors 100 of FIG. 1), and generate one or more new transaction sets (e.g., one of the transaction sets 504 of FIG. 5A) using characteristic values (e.g., the retrieved characteristic values 502 of FIG. 5A, the characteristic values 402 of FIG. 4, etc.) retrieved from a product characteristic database 118 (FIG. 1). Example processes that may be used to generate new transaction sets are described below in connection with FIGS. 7 and 8.

At block 604, the product affinity generator 204 (FIG. 2) generates one or more product affinity rules based on the new transaction set generated at block 602 and at least one existing transaction set retrieved from the transaction database 112 (FIG. 1). An example process that may be used to generate product affinity rules is described below in connection with FIG. 9. In some examples, the generated product affinity rules may be used for different purposes (block 605). For instance, if product recommendation(s) are to be generated (block 605), the example program 600 advances to block 606, and if further analysis of information related to segment attributes is to occur (block 605), then the example program 600 advances to block 610. At block 606, the product recommender 208 (FIG. 2) generates a product recommendation (e.g., the product recommendation 216 of FIG. 2) based on the affinity rule(s) generated at block 604. At block 608, the product recommender 208 sends the product recommendation generated at block 606 to the transaction processor 100 that sent the trade item numbers 212 received at block 602. The example segment affinity manager 224 develops relationships between product characteristic affinities and affinities associated with segment attributes, thereby resulting in affinity sets (block 610). Using the identified affinity sets of the product characteristics and associated affinities associated with segment attributes, the example affinity manager 106 analyzes existing product(s) for possible augmentation that will improve marketability of a new augmented product in the segment of interest (block 612). For example, the existing product by a product manufacturer, when augmented by one or more product characteristics having associated affinity with the segment of interest, result in a new augmented product that will exhibit improved marketability and/or sales in the segment of interest in which the manufacturer may not currently participate. The example program 600 then ends.

Figure 7:
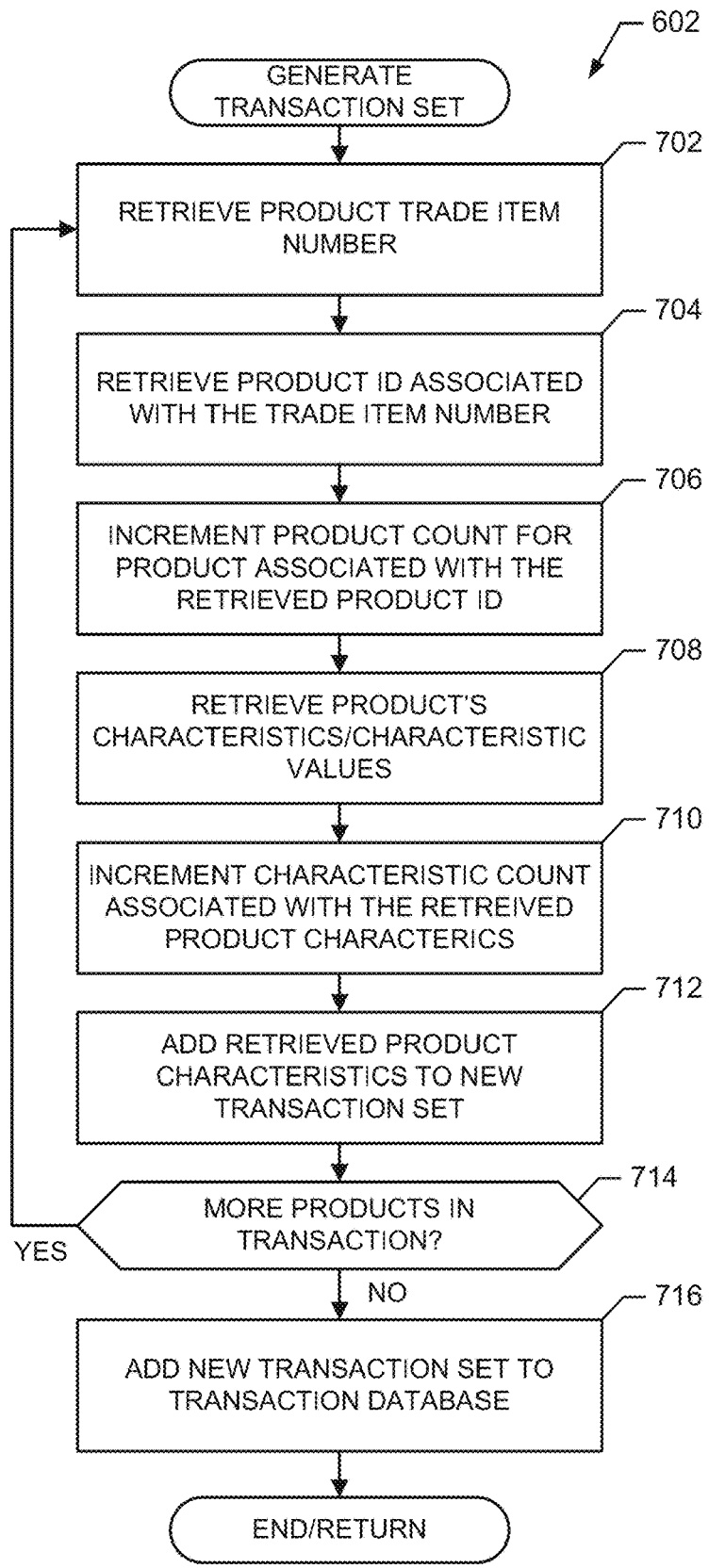
FIGS. 7 and 8 are flow diagrams representative of example machine readable instructions that may be executed to implement an example product retriever, an example characteristic retriever and/or an example affinity manager of FIG. 2 to generate new product characteristic transaction sets.

An example program 602 of FIG. 7 is executed to implement the example product retriever 200 of FIG. 2, in which the example characteristic retriever 202 (FIG. 2) and/or the example product affinity manager 206 (FIG. 2) generates new transaction sets (e.g., the transaction sets 500 of FIG. 5A) based on retrieval and/or receipt of a product transaction from the example transaction processor(s) 100. Initially at block 702, the product retriever 200 retrieves a trade item number (e.g., the trade item number 212 (e.g., UPC) of FIG. 2) associated with a transaction ID (e.g., the transaction ID 214 of FIG. 2). At block 704, the product retriever 200 retrieves a product ID (e.g., product ID 302 of FIG. 3) from a product database 108 using the trade item number received at block 702.

At block 706, the product affinity manager 206 increments a count on a map and/or table of product counts for the product associated with the product ID retrieved at block 704. At block 708, the characteristic retriever 202 retrieves characteristic value(s) (e.g., the characteristic values 402 of FIG. 4) from the product characteristic database 110 using the product ID retrieved at block 704. At block 710, the product affinity manager 206 increments a count on a map and/or table of characteristic counts for characteristic values defined by the MRE 102 (FIG. 1). At block 712, the product affinity manager 206 adds the characteristic values retrieved at block 708 to a new transaction set (e.g., one of the transaction sets 500 of FIG. 5A) associated with the transaction ID received at block 702.

At block 714, the product retriever 200 determines if there are more products associated with the transaction ID 214 (e.g., has received another trade item number from the transaction processor 100, has not received an end-of-transaction indicator, etc.). If there are more products in the transaction, program control returns to block 702. If there are no more products associated with transaction ID 214, program control advances to block 716. At block 716, the product affinity manager 206 adds the new transaction set generated at block 712 to the transaction database 112. The example program 602 then ends and control advances to block 604 of FIG. 6.

Figure 8:
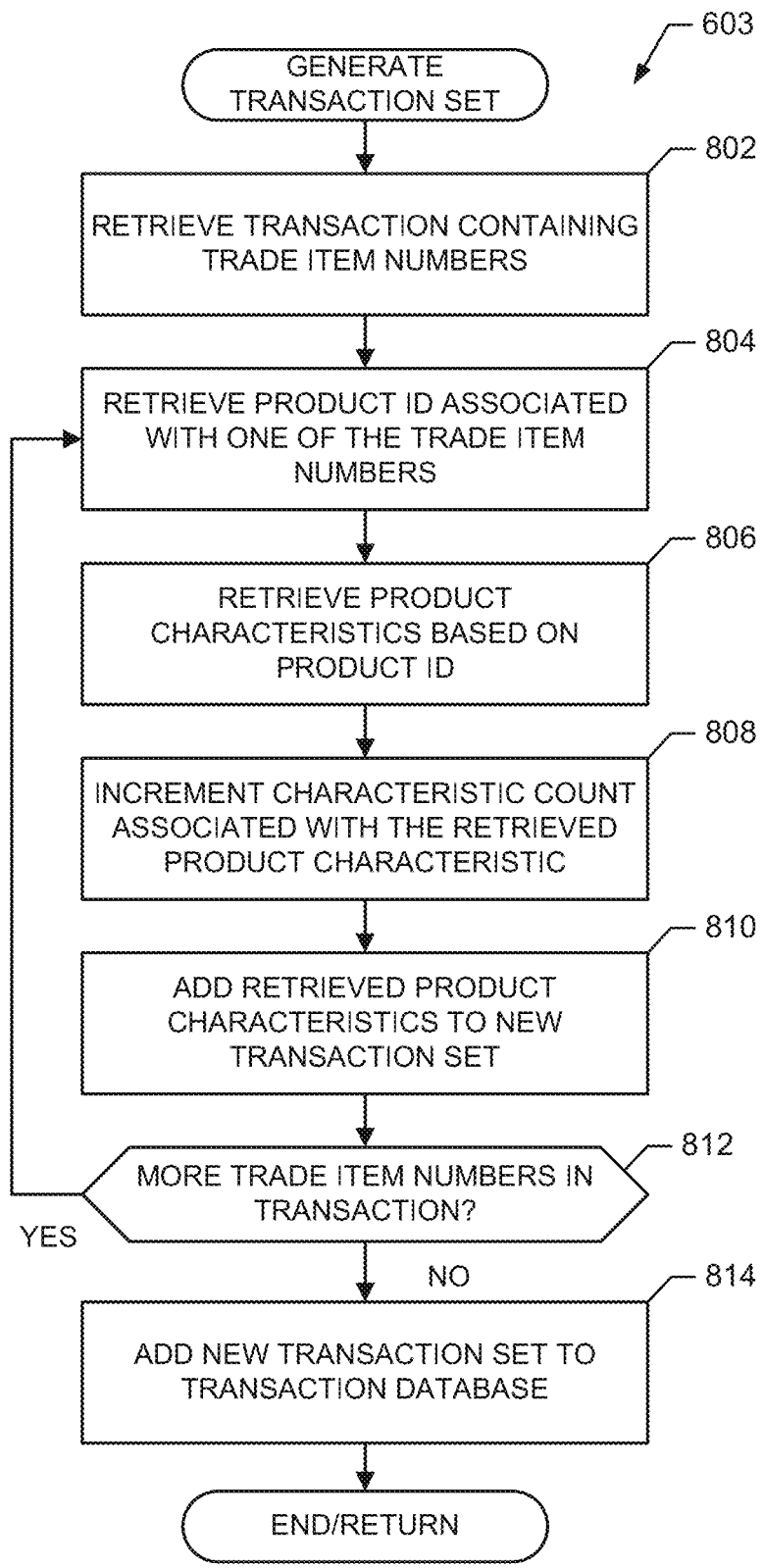

An example program 603 of FIG. 8 is executed to implement the example product retriever 200 of FIG. 2, in which the example characteristic retriever 202 (FIG. 2) and/or the example product affinity manager 206 (FIG. 2) generates new transaction sets (e.g., the transaction sets 500 of FIG. 5A) based on retrieval of transaction record(s) from the example transaction processor(s) 100. Initially, at block 802, the product retriever 200 receives a transaction record (e.g., the transaction record 210 of FIG. 2) associated with a transaction ID (e.g. the transaction ID 214 of FIG. 2) containing at least one trade item number (e.g., the trade item numbers 212 of FIG. 2). At block 804, the product retriever 200 retrieves a product ID (e.g., product ID 302 of FIG. 3) from a product database 108 using one of the trade item numbers received at block 802.

At block 806, the characteristic retriever 202 retrieves characteristic value(s) (e.g., the characteristic values 402 of FIG. 4) from the product characteristic database 110 using the product ID retrieved at block 804. At block 808, the product affinity manager 206 increments a count on a map and/or table of characteristic counts for characteristic values defined by the MRE 102 (FIG. 1). At block 810, the product affinity manager 206 adds the characteristic values retrieved at block 806 to a new transaction set (e.g., one of the transaction sets 500 of FIG. 5A) associated with the transaction ID received at block 802.

At block 812, the product retriever 200 determines if there are more trade item numbers in the transaction record received at block 802. If there are more products in the transaction, program control returns to block 804. If there are no more trade item numbers in the transaction record, program control advances to block 814. At block 814, the product affinity manager 206 adds the new transaction set generated at block 810 to the transaction database 112. The example program 603 then ends and control advances to block 604 of FIG. 6.

Figure 9:
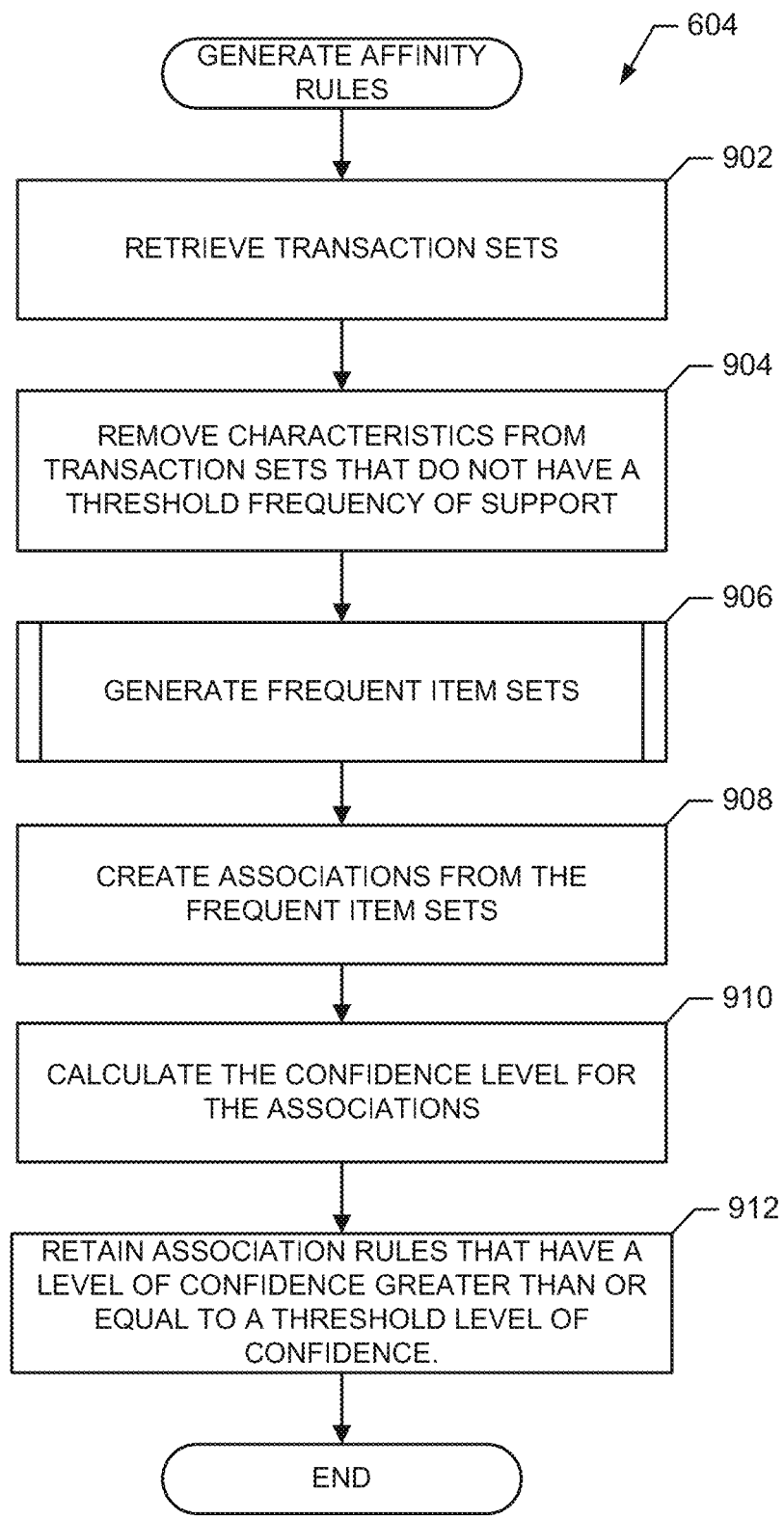
FIG. 9 is a flow diagram representative of example machine readable instructions that may be executed to implement an example affinity generator of FIG. 2 to generate product characteristic affinity rules.

An example program 604 of FIG. 9 is executed to implement the example product affinity generator 204 of FIG. 2 to generate affinity rules based on transaction sets. Initially, at block 902, the product affinity generator 204 retrieves transaction sets (e.g., transaction sets 500 of FIG. 5A) from the transaction database 112 (FIG. 1) and the new transaction set generated by the product affinity manager 206 (FIG. 2). In some examples, the product affinity generator 204 retrieves all the transaction sets from the transaction database 112. In some examples, the product affinity generator 204 grabs a portion of the transaction sets from the transaction database 112 based on, for example, commercial establishment type (e.g., a grocery store, an electronics store, a warehouse store, etc.), a product category (e.g., electronics, clothing, toys, etc.), a date/range of dates, and/or transaction sets that have characteristic values in common with the new transaction set.

At block 904, the product affinity generator 204 removes characteristic values from the transaction sets retrieved at block 902 that do not have counts on the map and/or table of characteristic value counts that are less than a threshold frequency of support defined by the MRE 102 (FIG. 1). At block 906, the product affinity generator 204 generates frequent item sets from the transaction sets prepared at block 904. An example process that may be used to generate frequent item sets is described below in connection with FIG. 10. At block 908, the product affinity generator 204 creates associations from the frequent item sets generated at block 906. At block 910, the product affinity generator 204 calculates a level of confidence (e.g., using Equation (3) discussed above) for each of the associations created at block 908. At block 912, the product affinity generator 204 compares the levels of confidence for the association rules calculated at block 910 to a threshold level of confidence defined by the MRE 102. The product affinity generator 204 retains, as affinity rules, the association with a level of confidence that is greater than or equal to the threshold level of confidence. As a result, examples disclosed herein identify which product characteristic groupings (e.g., the product characteristics that make up the frequent item sets) are the most likely to occur together. With this information, examples disclosed herein facilitate generation of product recommendations (e.g., at the point of sale, pre-market new product analysis, etc.), and/or facilitate marketing strategy development with target segments, as described in further detail below. The example program 604 then ends and control advances to block 605 of FIG. 6.

As described above, frequent item sets are identified from any number of permutations of product characteristic values (e.g., item sets). Those permutations that occur more than a threshold number of times may be identified as the frequent item sets. Identifying which permutations are to be analyzed for possible advancement or establishment as a frequent item set may be performed in any number of ways. For example, a tree-projection may be employed, an Apriori algorithm may be employed, a frequent pattern growth algorithm (e.g., frequent-pattern tree) may be employed, and/or each available permutation may be assembled and tested for a corresponding frequency count, without limitation. A non-limiting example of the frequent-pattern tree is described below, but examples disclosed herein are not limited thereto.

Figure 10:
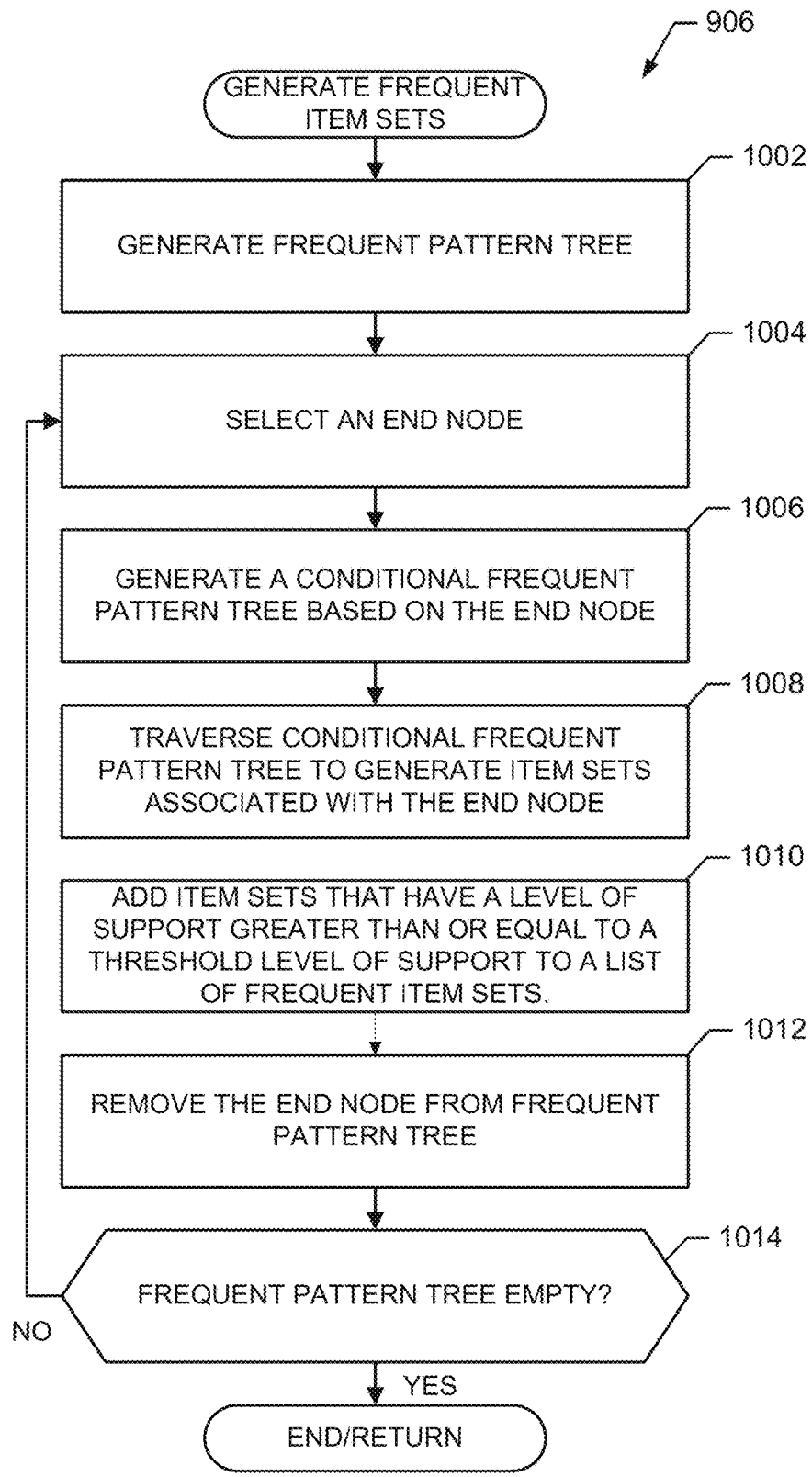
FIG. 10 is a flow diagram representative of example machine readable instructions that may be executed to implement an example affinity generator of FIG. 2 to generate frequent item sets.

An example program 906 of FIG. 10 is executed to implement the example product affinity generator 204 of FIG. 2 to generate frequent item sets based on transaction sets. Initially, at block 1002, the product affinity generator 204 generates a frequent-pattern tree from transaction sets (e.g. the transaction sets 500 of FIG. 5A). In some examples, the example product affinity generator 204 generates a frequent pattern-tree using at least a portion of transaction sets retrieved from a transaction database 112 (FIG. 1) (e.g., the transaction sets retrieved at block 902 by example program 604 of FIG. 9). At block 1004, the product affinity generator 204 selects an end node on the frequent-pattern tree generated at block 1002. At block 1006, the product affinity generator 204 generates a conditional frequent-pattern tree based on the end node selected at block 1004.

At block 1008, the product affinity generator 204 traverses the conditional frequent-pattern tree generated at block 1006 to create item sets associated with the end node selected at block 1004. At block 1010, the product affinity generator 204 calculates a level of support (e.g., using Equation (1) discussed above) for the item sets created at block 1008 and adds the item sets generated at block 1008 that have a level of support greater than or equal to a threshold level of support as defined by the MRE 102 (FIG. 1) to a list of frequent item sets. At block 1012, the product affinity generator 204 removes the end node selected at block 1004 from the frequent-pattern tree generated at block 1002. At block 1014, the product affinity generator 204 determines whether the frequent-pattern tree is empty. If the frequent-pattern tree is not empty, program control returns to block 1004. If the frequent-pattern tree is empty, the example program 906 ends and control advances to block 908 of FIG. 9.

Figure 11:
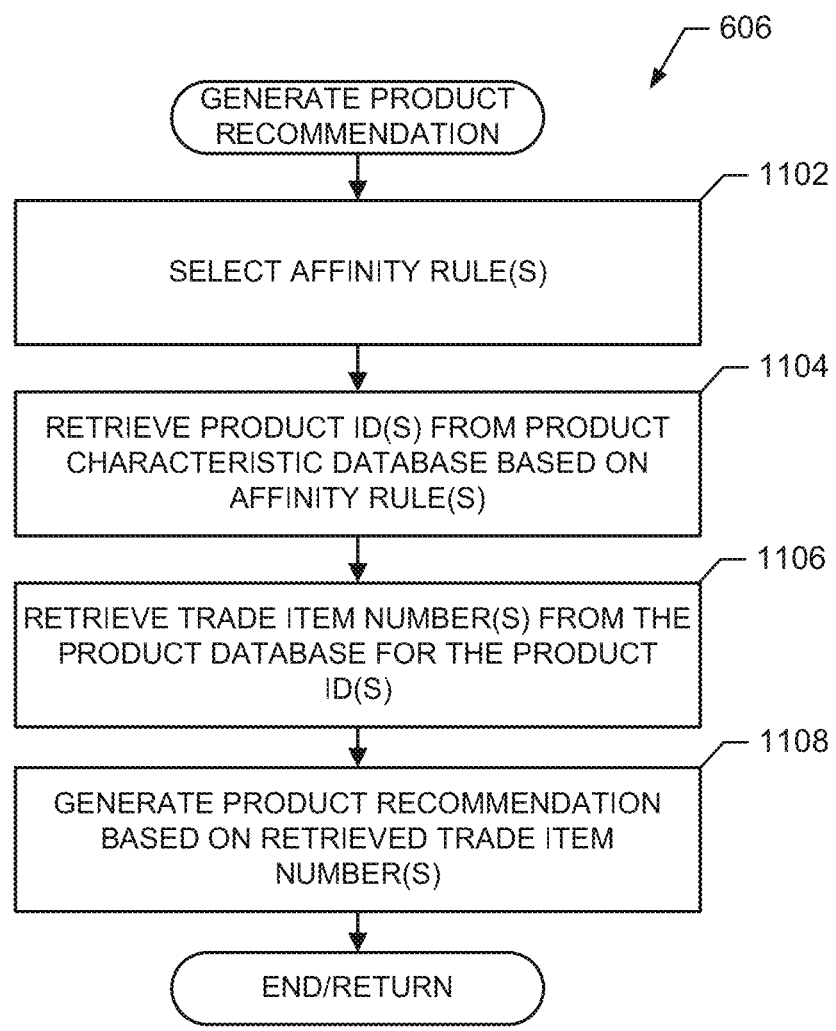
FIG. 11 is a flow diagram representative of example machine readable instructions that may be executed to implement the example product recommender of FIG. 2 to generate product recommendations.

An example program 606 of FIG. 11 is executed to implement the example product recommender 208 of FIG. 2 to generate product recommendations (e.g., the product recommendation 216 of FIG. 2). Initially, at block 1102, the product recommender 208 selects one or more affinity rules (e.g., the affinity rules generated by example program 900 of FIG. 9). In some examples, the product recommender 208 selects an affinity rule containing characteristic values on the LHS of the affinity rule that are in the transaction set created by the characteristic retriever 202 (FIG. 2). At block 1104, the product recommender 208 retrieves one or more product IDs from the product characteristic database 110 (FIG. 1) that are associated with characteristic values on the RSH of the affinity rule selected at block 1102. At block 1106, the product recommender 208 retrieves trade item numbers associated with the product IDs retrieved at block 1102 from the product database 108 (FIG. 1). At block 1108, the product recommender 208 generates a product recommendation (e.g., coupons, advertisement prompts, cross-promotional offers, marketing suggestions, product development research, etc.) based on the trade item numbers retrieved at block 1104. The example program 606 then ends and control advances to block 608 of FIG. 6, as described above.

Figure 12:
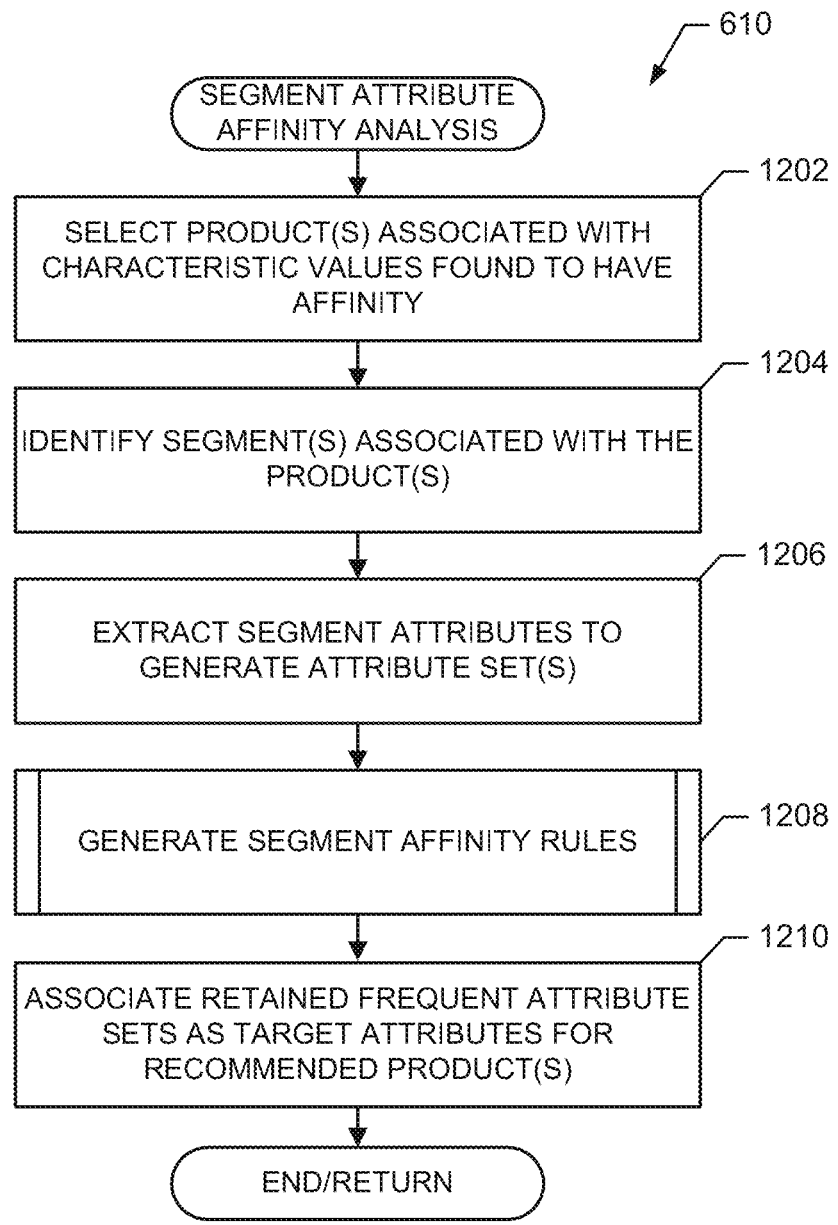
FIGS. 12-14 are flow diagrams representative of example machine readable instructions that may be executed to implement the example segment attribute retriever, the example segment affinity manager, the example attribute affinity generator and the example attribute permutation engine to identify segment attributes having affinity therebetween.

An example program 610 of FIG. 12 is executed by the example segment affinity manager 224, the example segment attribute retriever 220, the example attribute affinity generator 226 and the example attribute permutation engine 228 to analyze segment attributes associated with the product characteristics found to have product affinities therebetween. Generally speaking, examples disclosed herein have determined and/or otherwise identified particular product characteristics that have the strongest affinity with each other. In other words, the identified product characteristics are the most likely to occur together in a purchase transaction. While this information is particularly useful for the generation of product recommendations having those strongly associated product characteristics, as described above, such information can also be used together with segment information to determine and/or otherwise identify which segment attributes have a strong affinity therebetween. Knowledge of which segment attributes have a strong affinity with each other allows marketing efforts to be targeted to segments that include the one or more segment attributes having the strong affinity relationship. In particular, because some segment attributes are found in multiple other/different consumer segment definitions, such other consumer segments may reflect potential marketing opportunities for products having the previously identified product characteristic affinities. Additionally, knowledge of affinities between particular product characteristics and corresponding segment attributes reduces product placement errors and financial waste and/or personnel waste (e.g., product retooling, product redesign, etc.) when targeting particular segments with promotional and/or marketing efforts associated with the product.

In the illustrated example of FIG. 12, the product retriever 200 selects the product(s) that are associated with the characteristic values found to have affinity therebetween (block 1202), as described above. The example segment attribute retriever 220 identifies segment(s) associated with the product(s) (block 1204), and extracts segment attributes associated with the identified segment(s) (block 1206). In some examples, a particular product of interest has an associated default segment with which it belongs. For instance, an organic fruit drink with antioxidants may have a default segment of "Healthful Foodies." However, after identifying which particular segment attributes of the "Healthful Foodies" exhibit the strongest affinity, one or more other segments may be revealed that also contain one or more of those segment attributes having affinity therebetween. Attribute sets may be stored in the example segment database 114 for later analysis. As described above, each segment has one or more segment attributes that define the segment, in which the one or more segment attributes may reflect a particular demographic attribute (e.g., gender, age, etc.), a particular geographic attribute (e.g., town, city, state, region, country, etc.), a particular behavioral attribute (e.g., recreational runner, competitive swimmer, sedentary, etc.) and/or a particular lifestyle attribute (e.g., theater aficionado, married, single, single with children, married with children, etc.).

The example segment affinity manager 224 generates one or more segment affinity rules (block 1208), as described in further detail in connection with FIG. 13. The affinity rules identify which attribute sets (e.g., two or more segment attributes that could occur together) satisfy threshold levels of support and threshold levels of confidence. The example attribute affinity generator 226 associates frequent attribute sets as target attributes to be used when marketing to consumers with products that also contain the previously identified product characteristics having affinity relationships (block 1210), such as the example product characteristics identified in connection with example FIG. 9. The affinity manager 106 retains the (a) target attributes found to have affinity therebetween and (b) product characteristics having affinity therebetween as affinity sets. In other words, the target attributes and corresponding product characteristics are identified as having affinity with each other.

Figure 13:
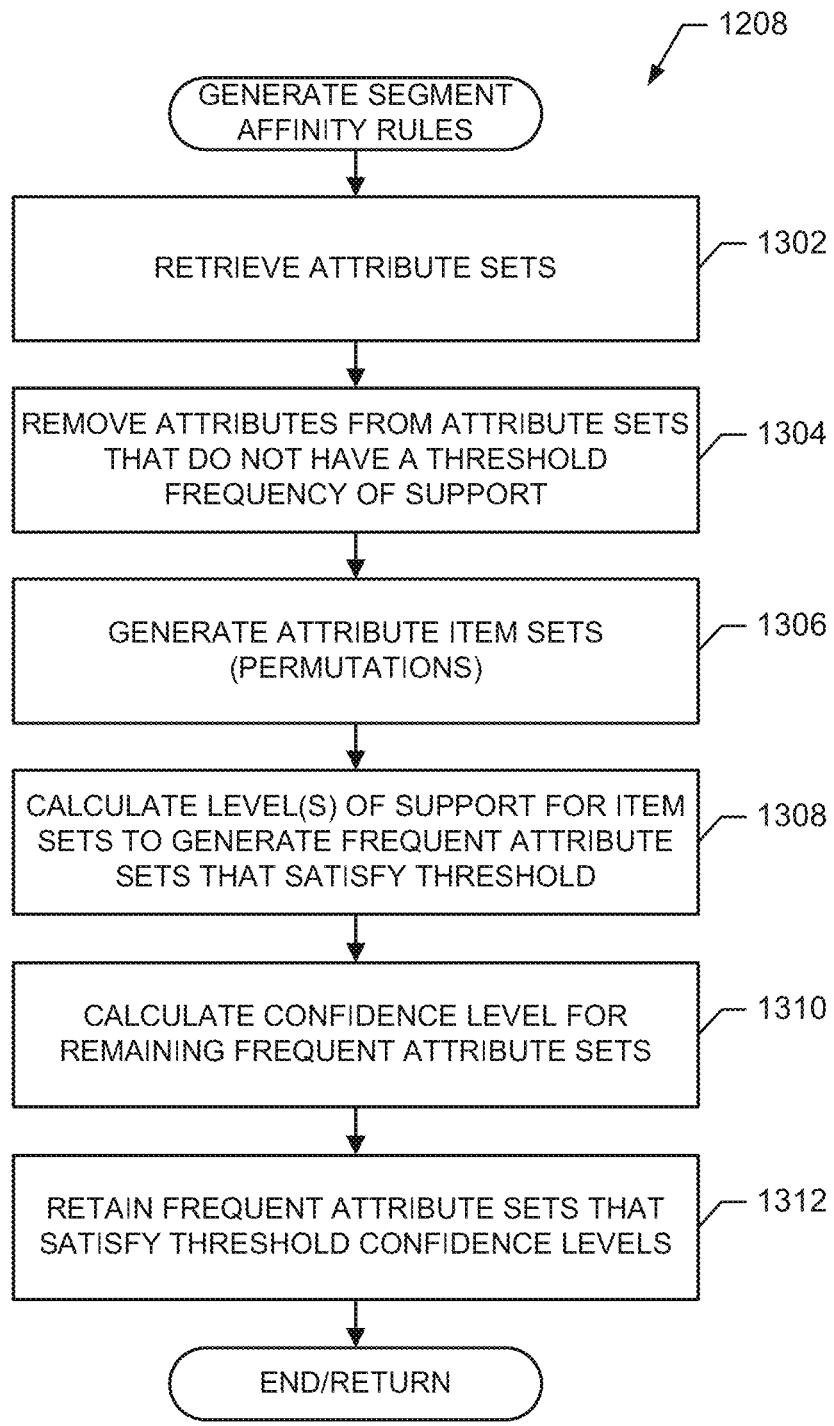

FIG. 13 illustrates additional detail for generating segment affinity rules (block 1208). In the illustrated example of FIG. 13, the segment attribute retriever 220 retrieves attribute sets previously stored in the example segment database 114 (block 1302). The example attribute affinity generator 226 removes segment attributes from the attribute sets that fail to satisfy a threshold frequency of occurrence (block 1304). For example, in the event a relatively obscure segment attribute has been identified, but only occurs on an infrequent basis, further processing of that obscure segment attribute is removed to, in part, improve processing resources when identifying possible permutations of segment attributes. The example attribute permutation engine 228 generates segment attribute item sets based on potential combinations of the individual segment attributes identified (block 1306). Generally speaking, each segment attribute may be found to occur in connection/association with one or more other segment attributes. When and if such combinations of two or more segment attributes occur in a manner that satisfies one or more threshold criteria (e.g., a threshold level of support in a manner consistent with example Equation 1, a threshold level of confidence in a manner consistent with example Equation 3), then such combined segment attributes are deemed to be significant indicators of marketing success for the corresponding products that may have associated product characteristics that also occur in a manner that satisfies the threshold affinity criteria.

The example attribute affinity generator 226 calculates level(s) of support for item sets to establish and/or otherwise define frequent item sets (block 1308). As described above, an item set is deemed a frequent item set (e.g., a frequent attribute item set) in the event it satisfies threshold criteria in a manner consistent with example Equation 1. Additionally, the example attribute affinity generator 226 determines whether the established frequent attribute sets also satisfy one or more threshold confidence levels in a manner consistent with example Equation 3 (block 1310). For example, the attribute affinity generator identifies a number of instances when a first segment attribute occurs along with a second segment attribute. When such occurrences satisfy a threshold value (e.g., a percentage value), then those two example attributes are deemed to have a strong affinity therebetween. While the example above refers to two example segment attributes, examples disclosed herein are not limited thereto.

Continuing with the example above, the two segment attributes may be identified and/or otherwise designated as a target attribute pair. As such, additional and/or alternate segments of interest may be discovered that also share these two segment attributes, thereby facilitating market strategy options. Those frequent item sets (of segment attributes) that satisfy the one or more threshold confidence levels are identified as candidate segment attributes to be used in marketing efforts for the previously identified products of interest that contain product characteristics with affinity (block 1312).

While examples disclosed above identify which segments will best promote sales of a particular product, thereby allowing the product manufacturer to avoid wasteful marketing campaigns in ineffective segments, additional examples disclosed herein permit new product development to allow the product manufacturer to enter a segment type that they might not currently reside and/or otherwise participate. After affinities have been established and/or otherwise identified between particular product characteristics and corresponding segment attributes, a target segment of interest may be selected. The target segment of interest may reflect a particular population of consumers that the product manufacturer does not currently target because of, for example, relatively poor sales from one or more prior attempts at that target segment.

In operation, the example segment attribute retriever 220 selects a target segment of interest and selects one attribute from that target segment of interest, and the example product affinity manager 206 determines whether the attribute has an affinity with a particular product characteristic. If so, the example product affinity manager 206 determines whether the product characteristic is already included in the existing product to be augmented. If not, then the example affinity manager 106 determines whether it is possible to add the candidate characteristic to the existing product. For example, if the candidate characteristic is associated with a crunchy texture, but the existing product is a smooth peanut butter, then adding this particular candidate characteristic is inconsistent with the existing product. However, for the sake of this example, assume the candidate characteristic is associated with increased fiber. In this example case, the example affinity manager 106 identifies the candidate characteristic as a potential augmentation option for the existing product, thereby generating a new product having a greater likelihood of success for the selected segment of interest.

Figure 14:
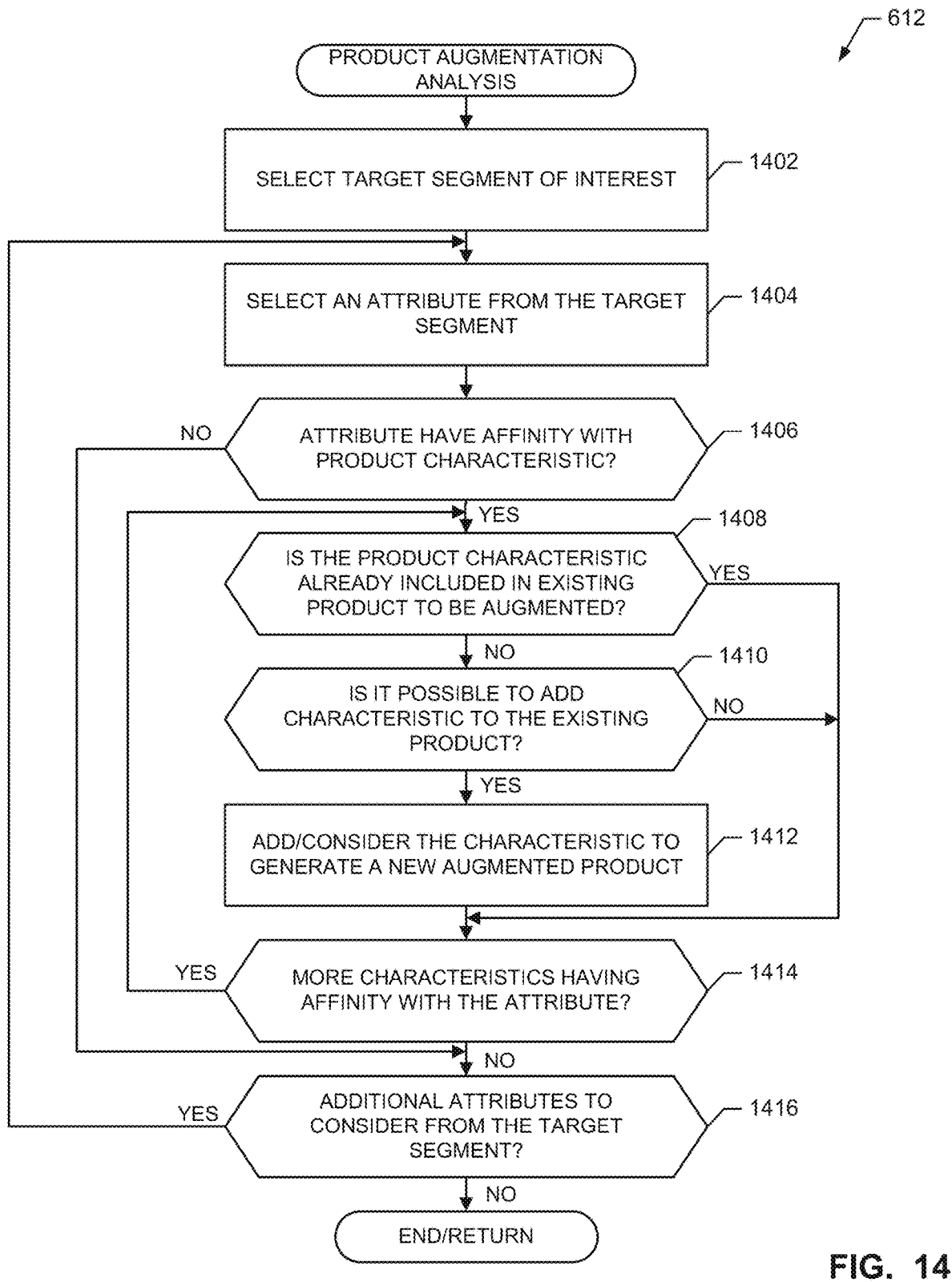

FIG. 14 illustrates additional detail associated with product augmentation analysis as described above and in connection with FIG. 6 (block 612). In the illustrated example of FIG. 14, the example segment attribute retriever 220 selects a target segment of interest from the example segment database 114 (block 1402). In some examples, the selected target segment of interest is associated with a particular segment that the product manufacturer wishes to consider for marketing purposes. In other examples, the selected target segment of interest is associated with a set of consumers having a particular volume or presence within a designated market area (DMA). In still other examples, the target segment is unassociated with the existing product at the current time, but the product manufacturer may desire participation within the target segment of interest to improve sales. The example segment attribute retriever 220 selects one attribute from the target segment of interest (block 1404), and the example product affinity manager 206 evaluates the attribute to determine whether it has an established affinity with a product characteristic from the affinity set (block 1406).

The example product affinity manager 206 evaluates the existing product to determine whether the product characteristic is already included in that existing product (block 1408). If so, control advances to block 1414 to determine if the candidate attribute has any additional characteristics to consider. However, if the product characteristic is not already included in the existing product (block 1408), then the example affinity manager 106 determines whether the product characteristic is suitable for addition to the existing product (block 1410). In some examples, the product database 108 includes categorical information for each product that may be marketed. For example, The Nielsen Company maintains a Product Reference Library (PRL) that codes more than 700,000 items, in which each item includes an average of forty (40) descriptive characteristics. The characteristics for each item may include, but are not limited to, manufacturer name, product size, brand, flavor, lot number, serial number, package type, and/or nutritional information. Additionally, the PRL also includes the associated UPC for the product. The example affinity manager 106 evaluates whether the product characteristic under consideration is consistent with the existing product being considered for augmentation. For example, in the event the existing product already includes a characteristic of "gluten free," and the product characteristic under consideration is "enriched flour," then the example affinity manager 106 identifies the product characteristic under consideration as incompatible with the existing product. However, in the event the product characteristic under consideration is appropriate, the example affinity manager 106 adds the product characteristic as a candidate characteristic that can be added to the existing product, thereby creating a new augmented product that will exhibit improved sales in the target segment of interest (block 1412).

The example product affinity manager 206 determines whether any additional product characteristics are yet to be considered that also have affinity with the attribute under consideration (block 1414). If so, control returns to block 1408, otherwise the example segment attribute retriever 220 determines whether the selected target segment of interest has additional attributes to consider (block 1416). If no further attributes are to be considered, then the example program 612 ends with one or more candidate product characteristics that are suitable to add to the existing product that will improve market success in the selected target segment of interest.

Figure 15:
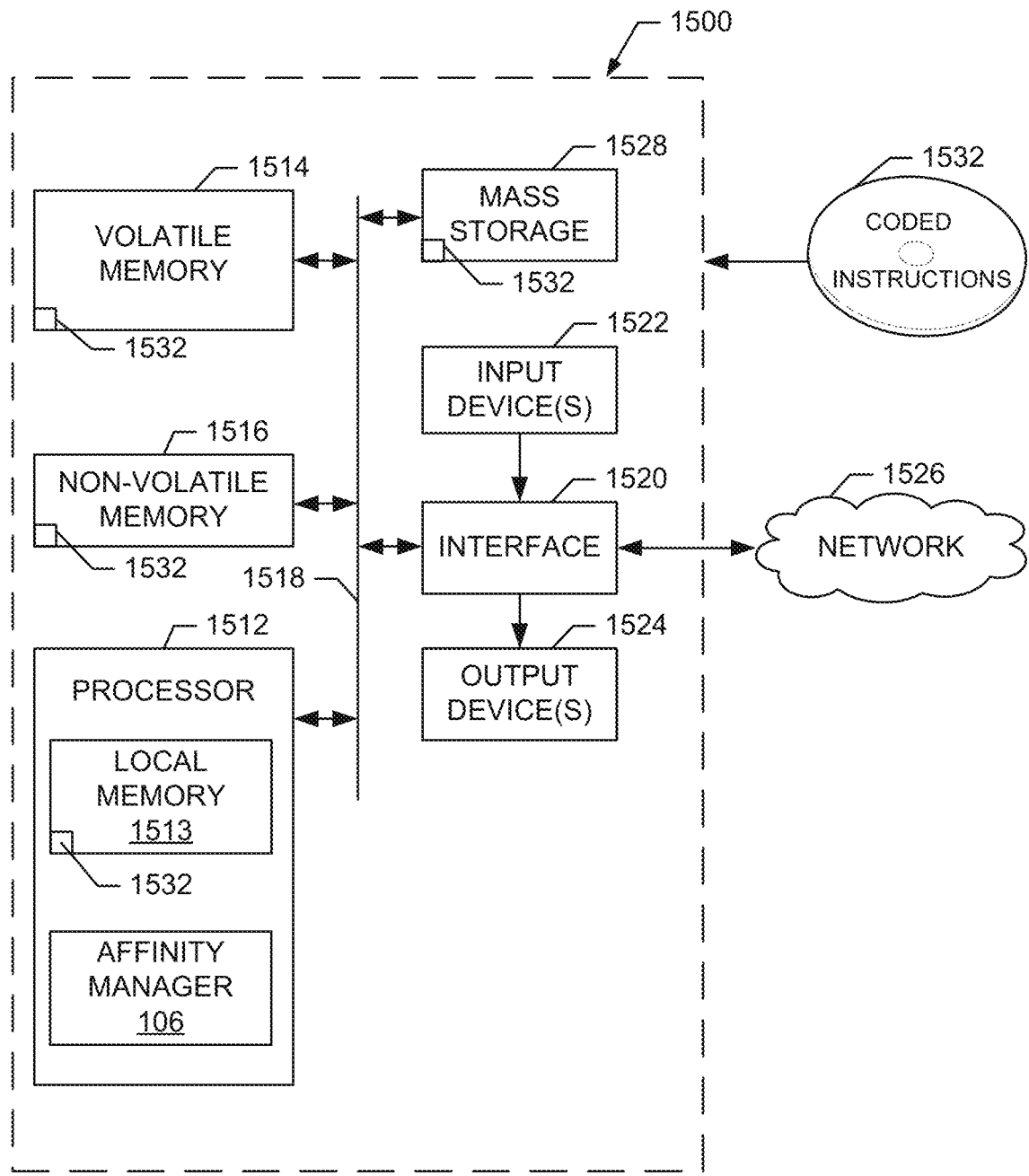
FIG. 15 is a block diagram of an example processor system that may execute any of the machine readable instructions represented by FIGS. 6-14 to implement the apparatus of FIGS. 1 and/or 2.

FIG. 15 is a block diagram of an example processor platform 1500 capable of executing the instructions of FIGS. 6-14 to implement the affinity manager 106 of FIGS. 1 and 2. The processor platform 1500 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1500 of the illustrated example includes a processor 1512. The processor 1512 of the illustrated example is hardware. For example, the processor 1512 can be implemented by one or more integrated circuits, logic circuits, microprocessors or controllers from any desired family or manufacturer.

The processor 1512 of the illustrated example includes a local memory 1513 (e.g., a cache). The processor 1512 of the illustrated example is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1516 may be implemented by flash memory and/or any other desired type of memory device. Access to the main memory 1514, 1516 is controlled by a memory controller.

The processor platform 1500 of the illustrated example also includes an interface circuit 1520. The interface circuit 1520 may be implemented by any type of interface standard, such as an Ethernet interface, a universal serial bus (USB), and/or a PCI express interface.

In the illustrated example, one or more input devices 1522 are connected to the interface circuit 1520. The input device(s) 1522 permit(s) a user to enter data and commands into the processor 1512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1524 are also connected to the interface circuit 1520 of the illustrated example. The output devices 1524 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1520 of the illustrated example, thus, typically includes a graphics driver card, a graphics driver chip or a graphics driver processor.

The interface circuit 1520 of the illustrated example also includes a communication device such as a transmitter, a receiver, a transceiver, a modem and/or network interface card to facilitate exchange of data with external machines (e.g., computing devices of any kind) via a network 1526 (e.g., an Ethernet connection, a digital subscriber line (DSL), a telephone line, coaxial cable, a cellular telephone system, etc.).

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, RAID systems, and digital versatile disk (DVD) drives.

The coded instructions 1532 of FIGS. 6-14 may be stored in the mass storage device 1528, in the volatile memory 1514, in the non-volatile memory 1516, and/or on a removable tangible computer readable storage medium such as a CD or DVD.

From the foregoing, it will be appreciated that examples have been disclosed which allow affinity rules for characteristic values to be dynamically generated with up-to-date transaction sets. Examples have been disclosed which allow a market research entity to provide cross promotional planning through characteristic value level affinity rules. Furthermore, by also identifying corresponding segment attributes that have a relatively strong association with each other, one or more additional and/or alternate segments of interest may be identified having a greater likelihood of product marketing success. By considering and/or otherwise identifying potential associations between product characteristics and segment attributes, computational resources may operate in a more efficient manner by reducing a number of matching iterations required to determine which consumer segment(s) are likely to improve sales of a product of interest.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   a product characteristic database storing product identifications (IDs) for a plurality of products and one or more product characteristics associated with respective ones of the product IDs;
   a transaction database storing past transactions and one or more of the product characteristics associated with one or more products in respective ones of the past transactions;
   a product affinity generator to:
      in response to receipt of a first transaction that includes a first product and a second product, access the product characteristic database to identify a first product characteristic corresponding to the first product and a second product characteristic corresponding to the second product, the first transaction received via a network from a first transaction processor;
      access the transaction database and perform a comparison of an occurrence of the first product characteristic and the second product characteristic in the same transaction to a frequency support threshold;
      define a level of association between the first product characteristic and the second product characteristic based on the comparison; and
      generate an affinity rule based on the level of association between the first product characteristic and the second product characteristic; and
   a product recommender to:
      in response to receipt of a second transaction that includes a third product, access the product characteristic database and identify a third product characteristic corresponding to the third product, the second transaction received via the network from a second transaction processor during a point-of-sale activity;
   generate a recommendation for a fourth product in connection with the second transaction based on the affinity rule and the third product characteristic; and
   cause an advertisement including the fourth product to be transmitted to the second transaction processor for presentation during the point-of-sale activity.

2. The apparatus of claim 1, wherein the first product characteristic includes one or more of a brand associated with the first product, a product type associated with the first product, a color associated with the first product, or packaging associated with the first product.

3. The apparatus of claim 1, wherein the affinity rule is a first affinity rule and the product affinity generator is to generate a second affinity rule based on the third product and the fourth product.

4. The apparatus of claim 1, wherein the first product and the second product define a first transaction set and the product affinity generator is to:
   identify, based on the third product characteristic, a second transaction set including a fifth product and a sixth product; and
   generate the affinity rule based on the second transaction set.

5. The apparatus of claim 4, wherein the product affinity generator is to:
   identify a third transaction set;
   perform a comparison of a product characteristic associated with the third transaction set to the frequency support threshold;
   generate the affinity rule based on the second transaction set if the third transaction satisfies the frequency support threshold; and
   refrain from using the third transaction set to generate the affinity rule if the third transaction set does not satisfy the frequency support threshold.

6. The apparatus of claim 1, wherein the product affinity generator is to identify the first product and the second product based on one or more of an establishment type associated with the second transaction or a product category associated with the second transaction.

7. The apparatus of claim 1, wherein the product affinity generator is to:
   assign a confidence level to the level of association between the first product characteristic and the second product characteristic; and
   generate the affinity rule in response to the assignment of the confidence level to the level of association.

8. A non-transitory computer readable storage medium comprising instructions that, when executed, cause at least one machine to at least:
   in response to receipt of a first transaction that includes a first product and a second product, access a product characteristic database storing product identifications (IDs) for a plurality of products and one or more product characteristics associated with respective ones of the product IDs, the first transaction received via a network from a first transaction processor;
   identify in the product characteristic database a first product characteristic corresponding to the first product and a second product characteristic corresponding to the second product;
   access a transaction database storing past transactions and one or more of the product characteristics associated with one or more products in respective ones of the past transactions;
   perform a comparison of an occurrence of the first product characteristic and the second product characteristic in the same transaction to a frequency support threshold;
   define a level of association between the first product characteristic and the second product characteristic based on the comparison;
   generate an affinity rule based on the level of association between the first product characteristic and the second product characteristic;
   in response to receipt of a second transaction that includes a third product, access the product characteristic database and identify a third product characteristic corresponding to the third product, the second transaction received via the network from a second transaction processor during a point-of-sale activity;
   generate a recommendation for a fourth product in connection with the second transaction based on the affinity rule and the third product characteristic; and
   cause an advertisement including the fourth product to be transmitted to the second transaction processor for presentation during the point-of-sale activity.

9. The non-transitory computer readable storage medium of claim 8, wherein the first product characteristic includes one or more of a brand associated with the first product, a product type associated with the first product, a color associated with the first product, or packaging associated with the first product.

10. The non-transitory computer readable storage medium of claim 8, wherein the affinity rule is a first affinity rule and the instructions, when executed, cause the at least one machine to generate a second affinity rule based on the third product and the fourth product.

11. The non-transitory computer readable storage medium of claim 8, wherein the first product and the second product define a first transaction set and the instructions, when executed, cause the at least one machine to:
   identify, based on the third product characteristic, a second transaction set including a fifth product and a sixth product; and
   generate the affinity rule based on the second transaction set.

12. The non-transitory computer readable storage medium of claim 11, wherein the instructions, when executed, cause the at least one machine to:
   identify a third transaction set;
   perform a comparison of a product characteristic associated with the third transaction set to the frequency support threshold;
   generate the affinity rule based on the second transaction set if the third transaction satisfies the frequency support threshold; and
   refrain from using the third transaction set to generate the affinity rule if the third transaction set does not satisfy the frequency support threshold.

13. The non-transitory computer readable storage medium of claim 8, wherein the instructions, when executed, cause the at least one machine to identify the first product and the second product based on one or more of an establishment type associated with the second transaction or a product category associated with the second transaction.

14. The non-transitory computer readable storage medium of claim 8, wherein the instructions, when executed, cause the at least one machine to:

assign a confidence level to the level of association between the first product characteristic and the second product characteristic; and generate the affinity rule in response to the assignment of the confidence level to the level of association.

15. An apparatus comprising:

a product characteristic database storing product identifications (IDs) for a plurality of products and one or more product characteristics associated with respective ones of the product IDs;

a transaction database storing past transactions and one or more of the product characteristics associated with one or more products in respective ones of the past transactions; and at least one processor to execute instructions to:
  in response to receipt of a first transaction that includes a first product and a second product, access the product characteristic database to identify a first product characteristic corresponding to the first product and a second product characteristic corresponding to the second product, the first transaction received via a network from a first transaction processor;
  access the transaction database and perform a comparison of an occurrence of the first product characteristic and the second product characteristic in the same transaction to a frequency support threshold;
  define a level of association between the first product characteristic and the second product characteristic based on the comparison;
  generate an affinity rule based on the level of association between the first product characteristic and the second product characteristic;
  in response to receipt of a second transaction that includes a third product, access the product characteristic database and identify a third product characteristic corresponding to the third product, the second transaction received via the network from a second transaction processor during a point-of-sale activity;
  generate a recommendation for a fourth product in connection with the second transaction based on the affinity rule and the third product characteristic; and
  cause an advertisement including the fourth product to be transmitted to the second transaction processor for presentation during the point-of-sale activity.

16. The apparatus of claim 15, wherein the first product characteristic includes one or more of a brand associated with the first product, a product type associated with the first product, a color associated with the first product, or packaging associated with the first product.

17. The apparatus of claim 15, wherein the affinity rule is a first affinity rule and the at least one processor is to generate a second affinity rule based on the third product and the fourth product.

18. The apparatus of claim 15, wherein the at least one processor is to:
  assign a confidence level to the level of association between the first product characteristic and the second product characteristic; and
  generate the affinity rule in response to the assignment of the confidence level to the level of association.

19. The apparatus of claim 15, wherein the first product and the second product define a first transaction set and the at least one processor is to:
  identify, based on the third product characteristic, a second transaction set including a fifth product and a sixth product; and
  generate the affinity rule based on the second transaction set.

20. The apparatus of claim 19, wherein the at least one processor is to:
  identify a third transaction set;
  perform a comparison of a product characteristic associated with the third transaction set to the frequency support threshold;
  generate the affinity rule based on the second transaction set if the third transaction satisfies the frequency support threshold; and
  refrain from using the third transaction set to generate the affinity rule if the third transaction set does not satisfy the frequency support threshold.

* * * * *